(12) United States Patent  
Baumgartner

(10) Patent No.: US 10,866,065 B2  
(45) Date of Patent: Dec. 15, 2020

(54) DRONE-ASSISTED SYSTEMS AND METHODS OF CALCULATING A BALLISTIC SOLUTION FOR A PROJECTILE

(71) Applicant: Daniel Baumgartner, Beverly Hills, CA (US)

(72) Inventor: Daniel Baumgartner, Beverly Hills, CA (US)

(*) Notice: Subject to any disclaimer, the term of this patent is extended or adjusted under 35 U.S.C. 154(b) by 0 days.

(21) Appl. No.: 16/822,925

(22) Filed: Mar. 18, 2020

(65) Prior Publication Data

US 2020/0300579 A1  Sep. 24, 2020

Related U.S. Application Data

(60) Provisional application No. 62/820,017, filed on Mar. 18, 2019.

(51) Int. Cl.
  *F41G 3/08* (2006.01)
  *B64C 39/02* (2006.01)
  *F41G 3/00* (2006.01)

(52) U.S. Cl.
  CPC ............ *F41G 3/08* (2013.01); *B64C 39/024* (2013.01); *B64C 2201/121* (2013.01)

(58) Field of Classification Search
  None
  See application file for complete search history.

(56) References Cited

U.S. PATENT DOCUMENTS

| 4,267,562 A | 5/1981 | Raimondi |
| 5,435,503 A | 7/1995 | Johnson, Jr. et al. |
| 5,631,654 A | 5/1997 | Karr |
| 5,822,713 A * | 10/1998 | Profeta .............. F41G 3/08 701/302 |

(Continued)

FOREIGN PATENT DOCUMENTS

| EP | 2525243 A1 * | 11/2012 | .............. G01W 1/08 |
| WO | 20160118665 A1 | 7/2016 | |
| WO | WO2017/098570 A1 * | 6/2017 | .............. A63B 71/06 |

OTHER PUBLICATIONS

M. Agnes, "Webster's New World College Dictionary," fourth edition; entry for the word, "mobile" on pp. 924-925; Wiley Publishing, Inc.; Cleveland, Ohio, USA; copyright in the year 2007. (Year: 2007).*

(Continued)

*Primary Examiner* — Bernarr E Gregory
(74) *Attorney, Agent, or Firm* — Haynes and Boone, LLP

(57) ABSTRACT

A drone-assisted ballistic system is provided. The ballistic system may include a plurality of mobile devices, a ballistic computer, and a data interface. Each mobile device may be operable to gather wind data along or adjacent to a flight path of a projectile to a target, each mobile device measuring at least wind speed and wind direction. The ballistic system may include at least one static device operable to gather wind data at or near a launch or firing position. The ballistic computer may be in data communication with the plurality of mobile devices to receive the wind data. The ballistic computer may be configured to calculate a wind compensation value for the projectile based on the wind data. The data interface may be in data communication with the ballistic computer to output the wind compensation value to a user in real-time.

28 Claims, 24 Drawing Sheets

(56) References Cited

U.S. PATENT DOCUMENTS

| | | | |
|---|---|---|---|
| 7,249,730 B1 | 7/2007 | Flippen, Jr. | |
| 7,856,750 B2 | 12/2010 | Sammut et al. | |
| 8,210,467 B2* | 7/2012 | Hubbell | G01W 1/08 244/13 |
| 8,314,730 B1* | 11/2012 | Musiak | G01S 7/003 342/25 B |
| 8,353,454 B2 | 1/2013 | Sammut et al. | |
| 8,729,442 B2 | 5/2014 | Boelitz et al. | |
| 8,818,705 B2* | 8/2014 | Spata | G01W 1/08 701/408 |
| 9,014,983 B1* | 4/2015 | Uy | G01W 1/02 244/30 |
| 9,347,742 B2* | 5/2016 | Varshneya | F41G 3/08 |
| 9,733,392 B2* | 8/2017 | Chan | G01W 1/10 |
| 9,804,293 B1* | 10/2017 | Fendell | G01W 1/08 |
| 9,851,179 B2* | 12/2017 | Volfson | F41G 3/08 |
| 10,012,667 B2* | 7/2018 | Downs | G01P 5/00 |
| 10,466,069 B1* | 11/2019 | Kirksey | B64C 39/024 |
| 10,591,254 B1* | 3/2020 | Kenney | F41G 3/08 |
| 2006/0010760 A1* | 1/2006 | Perkins | F41G 1/38 42/142 |
| 2014/0224009 A1* | 8/2014 | Brown | G01W 1/08 73/170.28 |
| 2014/0324348 A1* | 10/2014 | Volfson | F41G 3/08 702/3 |
| 2015/0304813 A1* | 10/2015 | Esposito | G01W 1/08 455/456.2 |
| 2015/0323286 A1* | 11/2015 | Theriault | F42B 12/38 42/111 |
| 2017/0090070 A1* | 3/2017 | Root et al. | G01W 1/08 |

OTHER PUBLICATIONS

M. Windsor, "Need to Know: Weather Drones"; Oct. 19, 2016; posted on the Internet at dronecenter.bard.edu. (Year: 2016).*

X. Xiang et al. "Wind Field Estimation Through Autonomous Quadcopter Avionics," 2016 IEEE/AIAA 35th Digital Avionics Systems Conference (DASC)(2016).

\* cited by examiner

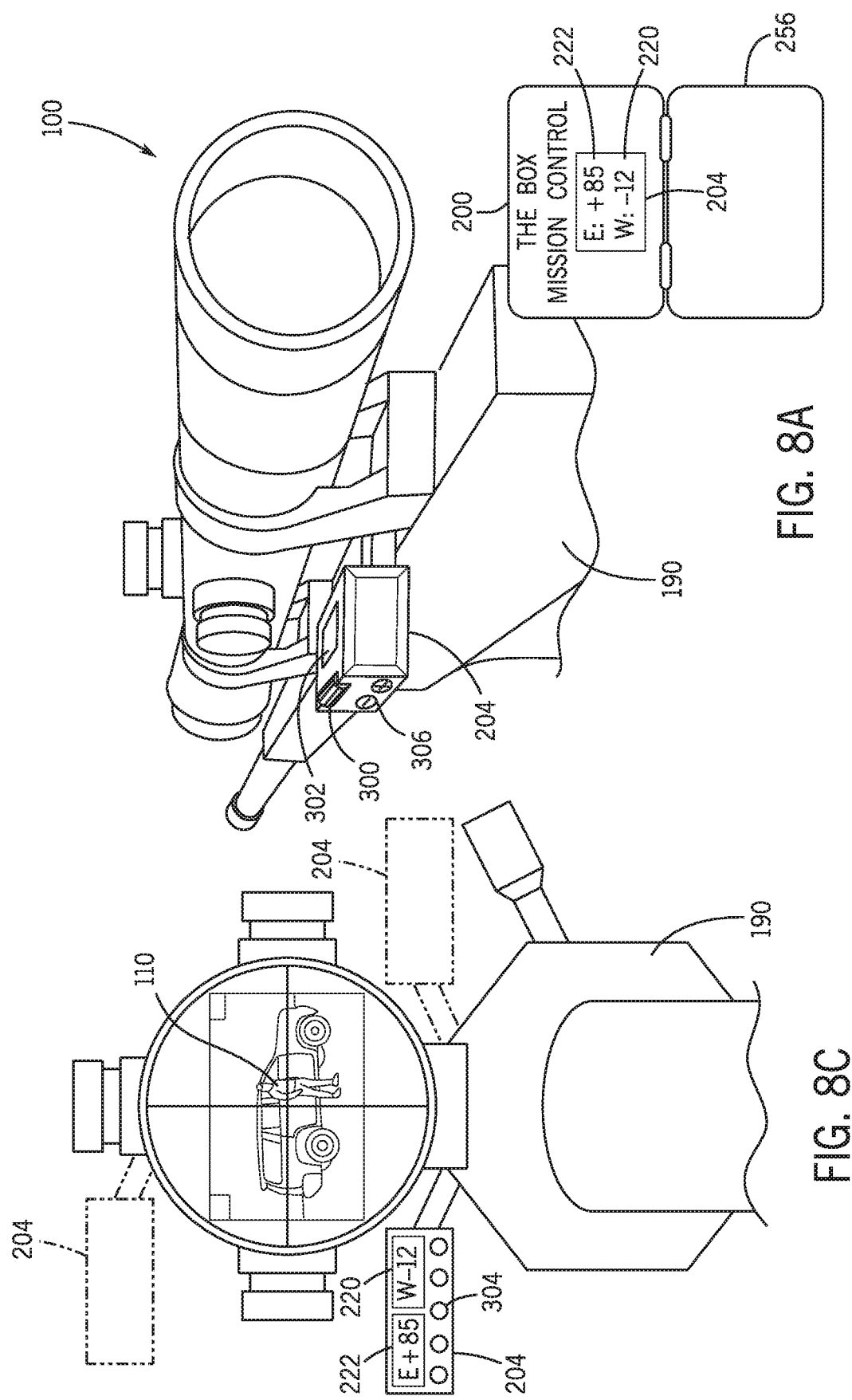

DRONE-ASSISTED SYSTEMS AND METHODS OF CALCULATING A BALLISTIC SOLUTION FOR A PROJECTILE

This application claims priority to U.S. Provisional Application No. 62/820,017, filed on Mar. 18, 2019, the benefit of which is claimed and the disclosure of which is incorporated herein in its entirety.

TECHNICAL FIELD

The present disclosure relates generally to ballistics and more specifically to drone-assisted systems and methods of calculating a ballistic solution for a projectile.

BACKGROUND

Environmental forces such as wind speed and wind direction can drastically affect the flight path of a projectile (e.g., a bullet) throughout its entire flight from a weapons system to target impact. The flight path can be affected by highly complex wind conditions in which inconsistent wind speeds and directions turn each shot into a highly difficult task. Typically, shooters (e.g., military or police snipers, recreational shooters, hunters, etc.) utilize supplemental devices to gauge wind speed and direction. For example, anemometers at the shooting position, downrange shooting flags, and other visual indicators (e.g., mirage reading, vegetation movement, etc.) have been used to estimate wind speed and direction from the muzzle to the target. This system, however, is highly prone to error as many of the readings are subject to user interpretation. This system is also subject to increased error as many interpretations are subject to wind bracketing (e.g., 5 mph wind determinations for any wind below a 5 mph mirage or vegetation movement threshold, 10 mph wind determinations for any wind between 5 and 10 mph mirage or vegetation movement thresholds, etc.). Positioning multiple sensors downrange is also time consuming and may not be practical in most shooting applications where time is of the essence and where the target may be moving. Further, in many applications, including sniping and hunting, creating a high first hit probability is critical as a second shot may not be possible either because of target movement or danger to the shooter.

It is therefore desirable to provide an improved ballistic system that addresses at least in part the above described problems and/or which more generally offers improvements or an alternative to existing arrangements.

SUMMARY

The present disclosure generally provides a drone-assisted ballistic system to gather wind data (e.g., measure wind speed, wind angle, and/or wind direction) and other parameters at designated points along the flight path of a projectile (e.g., a bullet). One or more drones may be deployed to the designated points to either gather wind data directly or place a remote wind sensor that gathers the needed wind data. The gathered wind data is transmitted in real-time to a ballistic computer. The ballistic computer utilizes the gathered wind data, in combination with other known ballistic and environmental data, to calculate a wind compensation value for a user to adjust the weapons system. For example, the wind compensation value may be used to adjust a scope of a firearm, either manually or automatically. The wind compensation value may be communicated orally or acoustically, displayed on the ballistic computer itself, on a digital display or holographic lens mounted on the firearm, and/or within the scope itself.

According to one aspect of the present disclosure, a ballistic system is provided. The ballistic system may include a plurality of mobile devices, a ballistic computer, and a data interface. Each mobile device may be operable to gather wind data along or adjacent to a flight path of a projectile to a target. Each mobile device may gather at least wind speed and wind direction. The ballistic computer may be in data communication with the plurality of mobile devices to receive the wind data. The ballistic computer may be configured to calculate a wind compensation value for the projectile based on the wind data. The data interface may be in data communication with the ballistic computer to output the wind compensation value to a user.

Optionally, the ballistic computer may calculate the wind compensation value for the projectile to be fired at a known distance. The wind compensation value may correlate to a windage adjustment to be made in a scope. The scope may be in data communication with the ballistic computer. The windage adjustment may be made automatically by the scope after receiving the wind compensation value from the ballistic computer.

Optionally, the data interface may include at least one of a digital display of the ballistic computer and a digital display mounted on a firearm. The digital display mounted on the firearm may include at least one of a holographic lens and a thermal imaging sight. The digital display mounted on the firearm may include at least one of a slant angle meter and a tiltmeter. At least one of the slant angle meter and the tiltmeter may be in data communication with the ballistic computer.

Optionally, the plurality of mobile devices may measure wind speed and wind direction in respective ballistic segments along a flight path of the projectile.

Optionally, the ballistic system may include at least one static device operable to gather wind data at or near a launch or firing position.

Optionally, each mobile device may include at least one of a drone and a remote wind sensor at designated spots along or adjacent to the flight path of the projectile.

Optionally, the ballistic computer may be in wireless communication with at least one of the plurality of mobile devices.

Optionally, the mobile devices may be in data communication with one another.

Optionally, the projectile may be at least one of a bullet, an artillery shell, a mortar shell, a ballistic missile, a golf ball, and a football.

According to another aspect of the present disclosure, a ballistic system is provided. The ballistic system may include a mission control system including a ballistic computer and a data interface, and a plurality of sensor systems operable to measure environmental data along a flight path of a projectile, the plurality of sensor systems in data communication with the mission control system. The ballistic computer may calculate a wind compensation value for the projectile to hit a desired target. The data interface may display the wind compensation value to a user.

Optionally, each sensor system may measure position and gather wind data at its respective location. At least one sensor system may be a drone. The wind data may be measured by the drone using at least one of external wind sensors, a gyroscope, GPS positioning, and visual drift sensors. The mission control system may provide a take-off and landing platform for the drone. The mission control system may include a storage compartment to receive the plurality of sensor systems during transport, a power module operable to charge the plurality of sensor systems, and a communications module operable to transmit instructions to and receive data from the plurality of sensor systems. The power module may include one or more rechargeable batteries connected to a solar panel. The mission control system may include a temperature-controlled ammunition compartment, and an interlink module in data communication with external devices or applications. The mission control system may include a flight module configured to calibrate a flight path of the drone relative to the mission control system and the direction of fire.

Optionally, the mission control system may be contained within a portable container.

Optionally, each sensor system may include a destruction application allowing the sensor system to be destroyed remotely by the mission control system.

Optionally, the projectile may be at least one of a bullet, an artillery shell, a mortar shell, a ballistic missile, a golf ball, and a football.

According to another aspect of the present disclosure, a method of calculating a ballistic solution of a projectile is provided. The method may include transmitting, to a ballistic computer, wind data gathered by a plurality of mobile devices and along or adjacent to a flight path of the projectile to a target. The wind data may include wind speed and wind direction in multiple segments of the flight path. The method may include calculating, using the ballistic computer, a wind compensation value for the projectile using the wind data. The method may include outputting the wind compensation value to a user.

Optionally, the method may include calculating, using the ballistic computer, an elevation compensation value for the projectile.

Optionally, the method may include transmitting, to the ballistic computer, wind data gathered by a static device near a launch or firing position. The wind data may include wind speed and wind direction at or near the launch or firing position. The ballistic computer may use the wind data gathered by the static device in calculating the wind compensation value for the projectile.

Optionally, the plurality of mobile devices may include a plurality of drones positioned along or adjacent to the flight path. At least one drone of the plurality of drones may include or function as a cargo platform to lift and place a remote wind sensor at a position along or adjacent to the flight path.

Optionally, the method may include calculating preferred locations to place the mobile devices based on at least one of local topography, shooting position, and target location. The preferred locations may be calculated automatically by the ballistic computer.

Optionally, outputting the wind compensation value to the user may include displaying the wind compensation value on a display. The wind compensation value may be displayed within the user's line of vision.

Optionally, transmitting the wind data to the ballistic computer may include relaying the wind data from one mobile device to another and to the ballistic computer.

According to another aspect of the present disclosure, a sniper system is provided. The sniper system may include a rifle, a scope connected to the rifle, and a ballistic system according to any aspect described above.

Optionally, at least one of the remote devices may include a sensing system and may be configured to operate within a radius of the ballistic computer such that the user of the system can be alerted to potential threats. The ballistic computer may be carried by a user and the remote device may follow the ballistic computer to provide alerts to the user as the user traverses a path.

According to another aspect of the present disclose, a ballistic system solution kit is provided. The ballistic system solution kit may include a manually carryable housing, a plurality of mobile wind sensors contained within the housing, a communications system, and a control system for positioning one or more of the plurality of mobile wind sensors via the communications system. The control system may receive wind data from one or more of the mobile wind sensors.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various examples of the ballistic system described herein and should not be construed as a complete depiction of the scope of the ballistic system.

FIG. 8A is a first representative view of a second data interface according to some examples of the present disclosure.

FIG. 8C is a third representative view of the second data interface of FIG. 8A according to some examples of the present disclosure.

DETAILED DESCRIPTION

Figure 1:
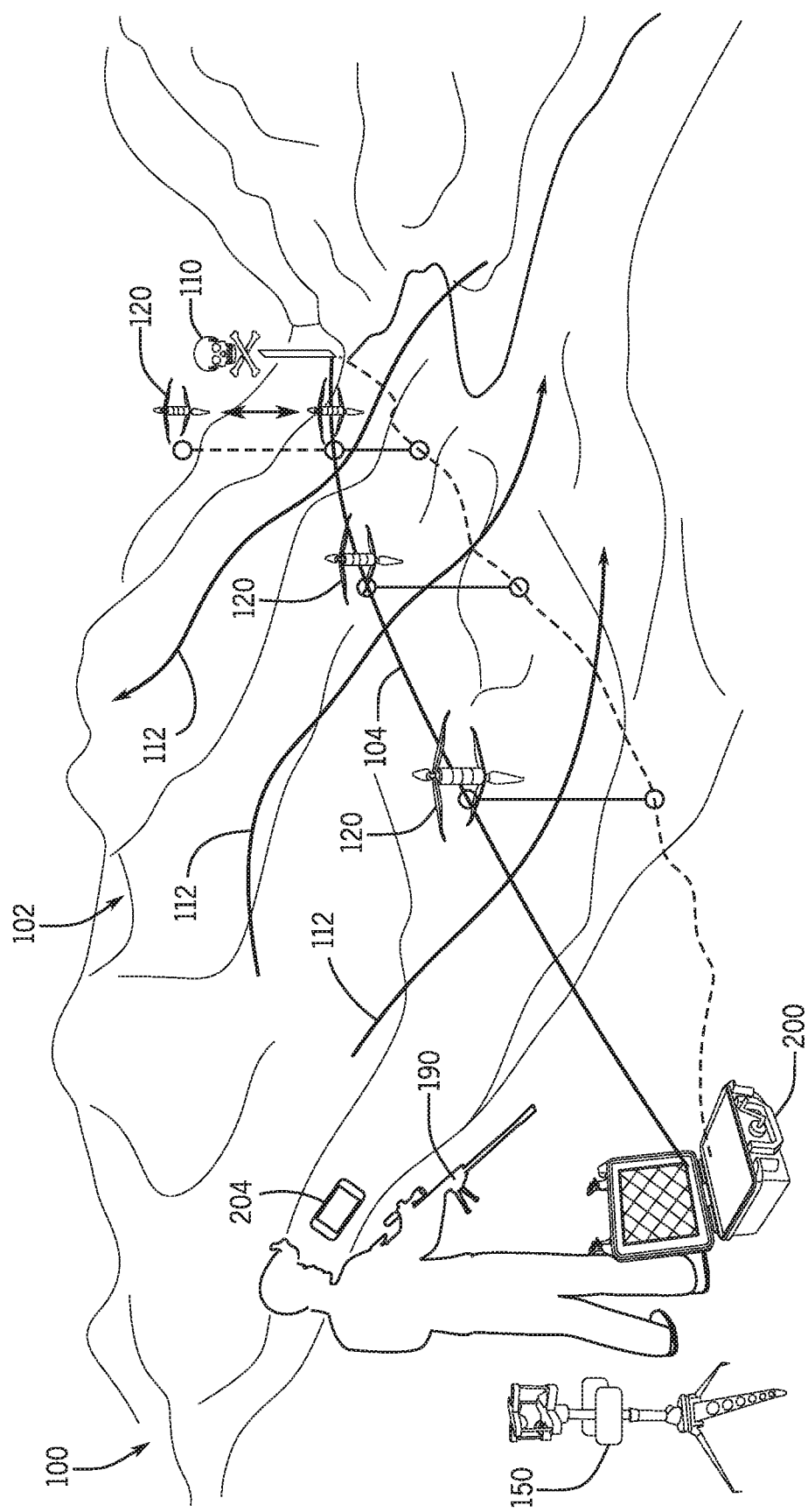
FIG. 1 is a perspective view of a ballistic system in a first rural or mountainous environment according to some examples of the present disclosure.

The present disclosure relates to ballistic systems and related devices, and more particularly to drone-assisted systems and methods of calculating a ballistic solution of a projectile (e.g., a bullet fired from a firearm) to increase shot accuracy and first hit probabilities under both simple and high complex wind conditions. Particularly, a ballistic system is provided that is operable to calculate a ballistic or firing solution based at least in part on wind data measured by one or more sensor systems positioned along or adjacent to the projectile's flight path to a target. The sensor systems may be temporary or mobile, stationary or static, or any combination of mobile and static devices. The firing solution is presented to the user in real time to deliver accurate, real-time wind compensation feedback to enhance first hit probability under even the most challenging environmental conditions.

As used herein, the terms "firearm" and "weapons system" refers to any device that propels an object or projectile of any caliber, including direct fire weapons such as rifles as well as indirect fire weapons such as artillery, mortar, and ballistic missile systems. For example, "firearm" may refer to handguns, pistols, rifles, shotgun slug guns, and muzzle-loader rifles, whether single shot, repeater, semi-automatic, or fully-automatic. The term "firearm" may also refer to a remote, servo-controlled firearm wherein the firearm has auto-sensing of both position and directional barrel orientation. "Firearm" may also refer to chain guns, belt-feed guns, machine guns, or the like. "Firearm" may also refer to projectile propulsion devices, such as artillery, mortars, canons, tank canons, rail guns, or any other projectile that flies passively through air. In this manner, "firearm" and "weapons system" may be used interchangeably.

As used herein, the term "drone" refers to a pilotless aircraft, such as an airplane, helicopter, or other machine capable of flight. "Drone" may refer to any flying object capable of hovering in the air and remaining at a defined location. "Drone" may also refer to any flying object that may be piloted, either autonomously or via remote control, to a defined location. For example, "drone" may refer to an aircraft piloted by remote control or onboard computers, such as an unmanned aerial vehicle (UAV), an unmanned aerial system (UAS), or the like. The "drone" may include a fixed-wing, a rotorcraft, or a quadcopter design, among others. In this manner, the term "drone" is characterized by function and not by shape or flight technology. The "drone" may use nanotechnology to ensure low or ultra-low visibility. Further, the "drone" may use noise cancelling technology or other sound suppressing technology to maintain a quiet operation. The "drone" may use smart or organic surface technology to alter the drone shape, color, and/or visual appearance according to environment. Further, the "drone" may use smart or organic surface technology to create and maintain a temperature neutral device surface to limit or prevent undesired thermal optic sensor detection.

As used herein, the term "projectile" refers to any object propelled through the air by the exertion of a force. "Projectile" may refer to a bullet, an artillery shell, a mortar shell, a ballistic missile, a golf ball, a football, or any other object whose flight path is likely to be affected by wind conditions. The projectile includes a mass and a ballistic coefficient. Once fired or propelled through the air, the projectile includes an initial velocity (e.g., a muzzle velocity). Depending on the application, the mass, ballistic coefficient, and velocity of the projectile may remain substantial constant or may vary along its trajectory. For instance, the velocity of the projectile may decrease along the projectile's trajectory, such as due to friction of the projectile with the surrounding air. The ballistic coefficient of the projectile may also vary with distance along the projectile's trajectory. For instance, the ballistic coefficient may rise initially but thereafter decrease with increased distance along the projectile's trajectory. In this manner, the projectile may include a single ballistic coefficient that is an average of measured ballistic coefficients at incremental distances. In some examples, the projectile may include multiple ballistic coefficients, each ballistic coefficient corresponding to a different ballistic range (e.g., one ballistic coefficient for ranges between 0 and 500 yards, another ballistic coefficient for ranges between 500 and 1000 yards or anything greater than 500 yards, etc.).

As used herein, the term "area of operation" refers to the area where the projectile is to be launched or fired, along the flight path of the projectile, and to the desired target. The area of operation may be in rural or urban environments, in areas with flat or varying terrain, in highly mapped or relatively unknown topography, or the like. The shooting and target locations may be known or may be determined in situ in real time.

As used herein, the term "user" refers to any person, system, application, or entity associated with the shooting operations. "User" may refer to a shooter, a spotter, or a commander or leader having oversight over a unit, whether located within the area of operation or otherwise. "User" may refer to a computer system, server, mobile electronic device, or application. Though reference is often made to a shooter in the following description, such references are for illustration purposes only and are not limiting.

Figure 2:
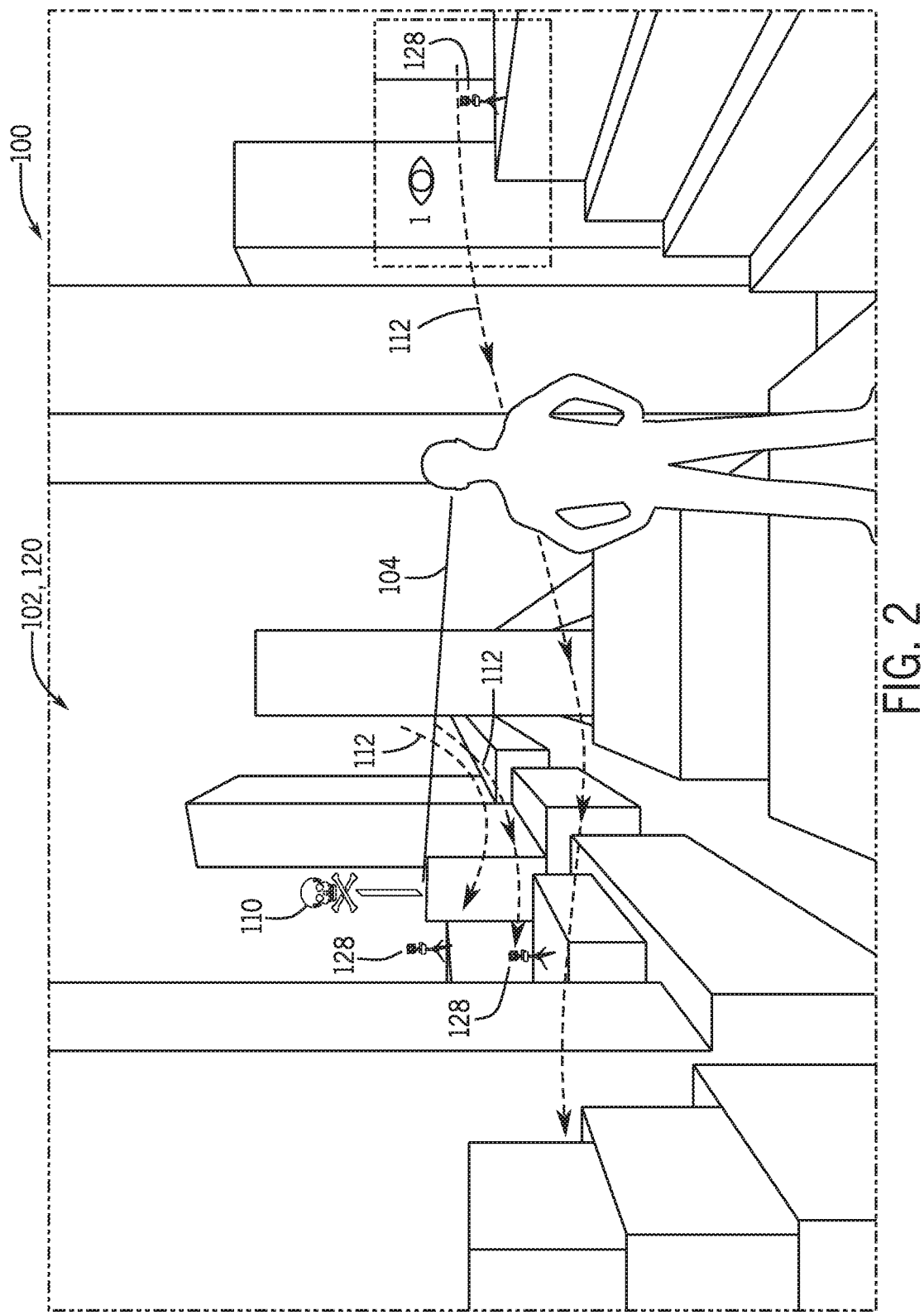
FIG. 2 is a perspective view of a ballistic system in a second urban environment according to some examples of the present disclosure.
Figure 3:
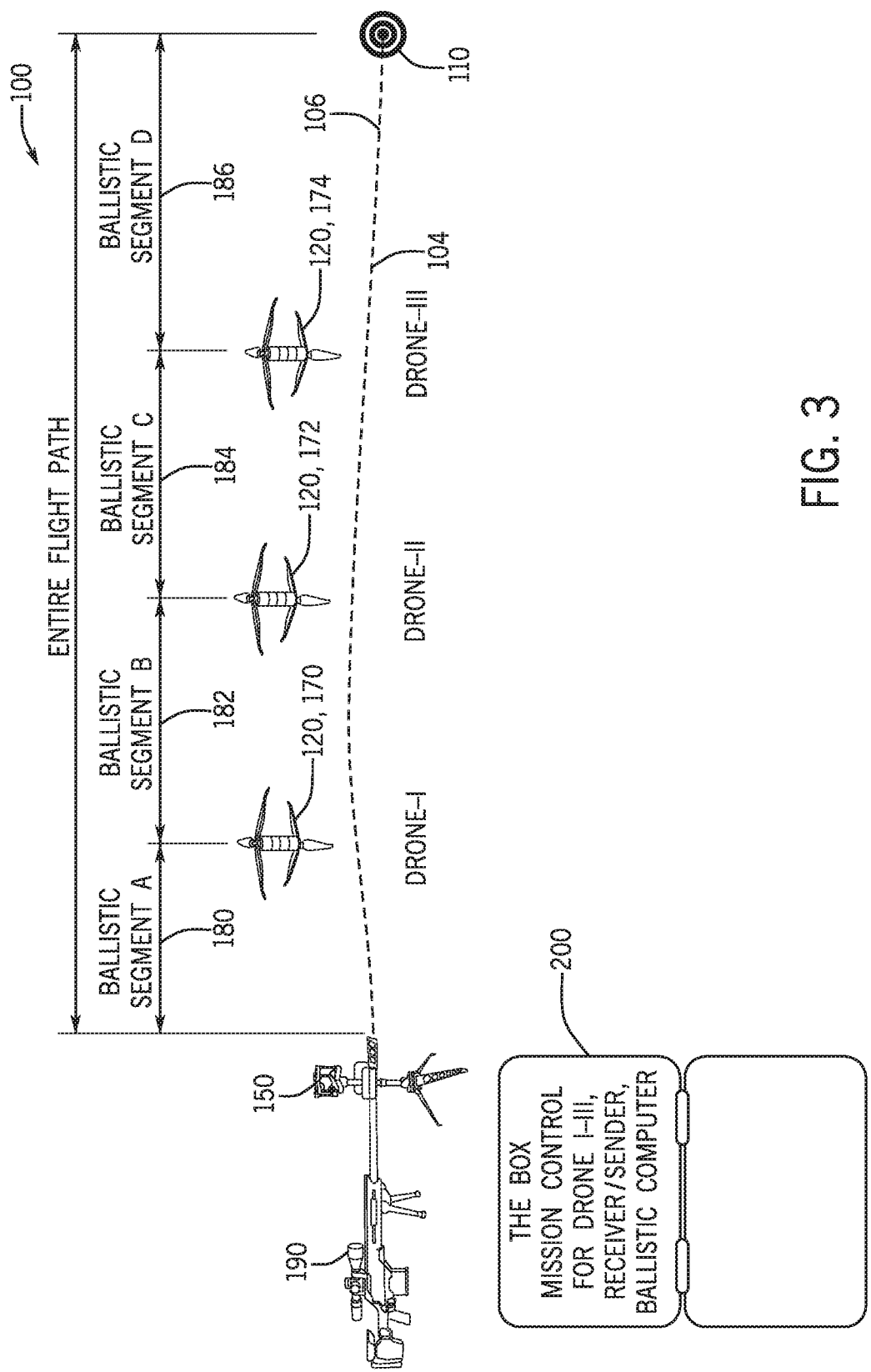
FIG. 3 is a schematic view of the ballistic system of FIG. 1 in use according to some examples of the present disclosure.

FIGS. 1-3 illustrate various views of an exemplary ballistic system 100. FIG. 1 is a perspective view of the ballistic system 100 in a first rural or mountainous environment according to some examples of the present disclosure. FIG. 2 is a perspective view of the ballistic system 100 in a second urban environment according to some examples of the present disclosure. FIG. 3 is a schematic view of the ballistic system 100 in use according to some examples of the present disclosure. Referring to FIGS. 1-3, the ballistic system 100 includes a plurality of sensor systems 102 operable to measure environmental data along a flight path 104 of a projectile 106. For instance, the sensor systems 102 may measure, among others, wind data along or adjacent to the flight path 104 of the projectile 106 to a target 110. The measured wind data may include wind speed, wind angle, and wind direction, or any combination thereof, of one or more winds 112. In some examples, the sensor systems 102 may measure other environmental data aiding a ballistic calculation of the projectile's trajectory. For example, the sensor systems 102, either collectively or each individually, may measure temperature, humidity, altitude, and atmospheric pressure (either absolute or relative), among others, or any combination thereof. In some examples, the sensor systems 102 may measure its relative or absolute position, such as via Global Positioning System (GPS), compass, visual sensors, or other navigational positional systems or technologies. In such examples, the sensor systems 102 may create a 3D wind mapping at designated GPS position. Depending on the application, each sensor system 102 may measure a single environmental factor, with all sensor systems 102 collectively gathering the needed data to make accurate ballistic calculations for the projectile 106. In other examples, the data gathering of the sensor systems 102 may overlap to provide increased ballistic calculation accuracy, such as averaging the overlapping data or using separate data for separate ballistic segments of the projectile's trajectory, as explained in more detail below.

The sensor systems 102 may include many configurations. As one example, the sensor systems 102 may include a plurality of mobile devices 120 each operable to measure environmental data, such as any combination of wind speed, wind angle, and wind direction. The mobile devices 120 may be any device or system operable to measure the desired environmental data. For instance, the mobile devices 120 may include at least one of a drone 124 and a remote wind sensor 128 temporarily positioned at designated spots or locations along or adjacent to the flight path 104 of the projectile 106. Each drone 124 or remote wind sensor 128 may be capable of measuring wind data and position.

Figure 4:
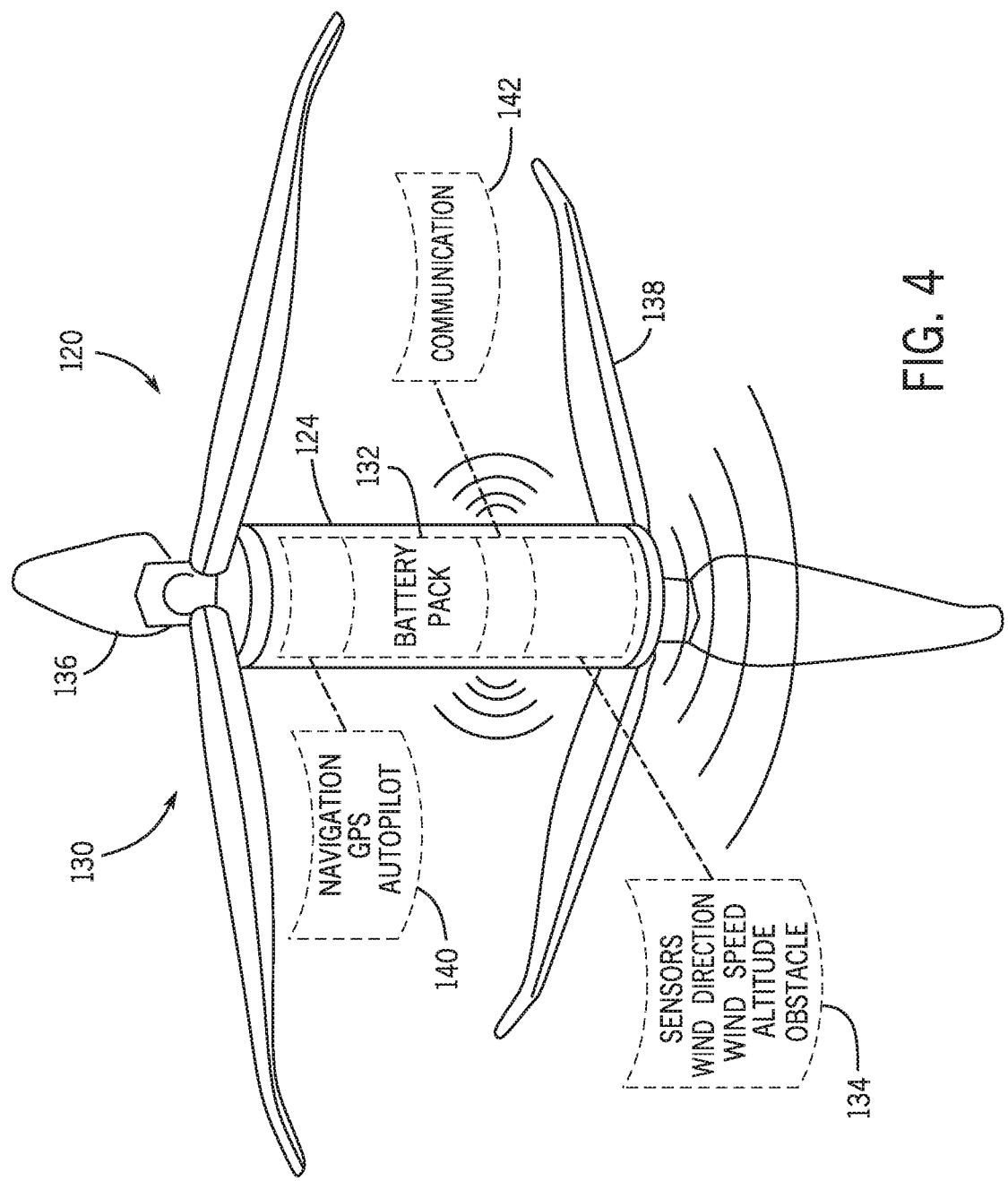
FIG. 4 is a schematic view of a mobile sensing device associated with a ballistic system according to some examples of the present disclosure.

FIG. 4 is a schematic view of a mobile device 120 associated with the ballistic system 100 according to some examples of the present disclosure. Referring to FIG. 4, the mobile device 120 may be a drone 124. The drone 124 may include many configurations. For instance, the drone 124 may include propulsion system 130, a battery pack 132, and a sensor system 134. The propulsion system 130 may include many configurations capable of propelling the drone 124 through the air. For example, the propulsion system 130 may include one or more rotor systems, such as a first rotor system 136 and a second rotor system 138. Depending on the application, the first and second rotor systems 136, 138 may be intermeshing rotor systems, with the first and second rotor systems 136, 138 turning in opposite directions and mounted with a slight angle to each other, in a transversely symmetrical manner, so that the rotors intermesh without colliding. In some examples, the first rotor system 136 may be on one side of the drone 124 and the second rotor system 138 may be on an opposite side of the drone 124, such as on a top side and a bottom side of the drone 124, respectively, although other configurations are contemplated. Depending on the application, the rotor systems 136, 138 may be foldable or disconnectable from the body of the drone 124 to provide compact transportation, as explained below.

The battery pack 132 may include many configurations capable of providing power to the propulsion system 130. For instance, the battery pack 132 may be implemented as one or more batteries (e.g., lithium-ion batteries, nickel-cadmium batteries, nickel-metal hydride batteries, or the like, as well as ultracapacitor modules and supercapacitors). The battery pack 132 may be military grade and have a long battery life (e.g., greater than 40 minutes flight time, between 20 and 40 minutes of flight time, or the like).

The sensor system 134 may include many configurations. For instance, the sensor system 134 may include any combination of sensors providing any combination of the following features: (1) GPS position/navigation, (2) wind speed measurement, (3) wind direction measurement, (4) wind angle measurement, (5) obstacle avoidance during flight, (6) toxin detection, (7) smoke detection, (8) target acquisition and/or tracking, (9) non-visible light detection/measurement (e.g., infrared, electromagnetic, etc.), among others. Depending on the application, the wind speed measurement may be within about 0.1 m/s accuracy/resolution. The wind direction measurement may be within about 1.0 degree accuracy/resolution. The wind angle measurement may be within about 1.0 degree accuracy/resolution.

The drone 124 may include other features for convenience. For example, the drone 124 may include a navigation system 140 and a communications system 142. The navigation system 140 may include a military-grade GPS system, autopilot features, flight stability features, or any combination thereof. For example, in addition to providing GPS position/navigation, the navigation system 140 may compensate for environmental conditions, such as providing stable flight operation in wind conditions up to about 20 m/s. The communications system 142 may allow control signal and data transfer between the drone 124 and a controller, between drones 124, or the like. The communications system 142 may be encrypted to provide a secure communication channel.

Where the mobile device 120 is a drone 124, the wind data may be measured through sensors integrated with the drone 124, external sensors attached to the drone 124, through the drone's flight systems, or through other sensors and systems of the sensor system 134. For instance, external wind sensors configured to measure wind data and combined into an add-on device may be attached to a drone already in inventory, such as a commercial drone. In other examples, the drone 124 may be manufactured originally with wind sensors. Example wind sensors include, but are not limited to, velocity anemometers (e.g., cup anemometers, vane anemometers, hot-wire anemometers, laser doppler anemometers, ultrasonic anemometers, or acoustic resonance anemometers), velocity anemometers (e.g., plate anemometers or tube anemometers), or the like. In some examples, the drone 124 may utilize one or more pressure sensors to determine wind speed and direction. For instance, wind speed and direction may be measured using a solid-state pressure film wrapped around the drone 124. In such examples, the drone 124 may determine wind speed and direction based on the sensed value and position along the pressure film.

In some examples, the drone 124 may include sensors that visually detect drifting and/or rotation of the drone 124 due to ambient wind. Additionally or alternatively, the wind data may be measured through the drone's internal gyroscope or other flight systems/hardware. For instance, the drone's tendency to rotate along one or multiple axes due to ambient wind acting on the drone 124 may be detected by the gyroscope or other flight system hardware/sensors. In one example, the drone 124 includes GPS sensors that the drone 124 may utilize to gauge wind direction and speed by a change in position. Further or alternatively, the drone 124 may include force sensors detecting the force and direction exerted by each rotor to thereby determine a value for wind data. In these and other examples, the drone 124 may determine wind speed, angle, and/or direction based on any one of the methods described above or based on a combination of any two or more methods described above to provide increased wind data accuracy.

Referring to FIG. 1, the drones 124 and/or ballistic system 100 may include a smart feature to position the drones 124 at designated spots or locations along or adjacent to the flight path 104 of the projectile 106. For instance, the drones 124 may be positioned along or adjacent to the flight path 104 based on the line-of-sight distance to the target 110, the terrain variation between the shooter and the target 110, the number of drones 124 in the ballistic system 100, etc., or any combination thereof. Specifically, the drones 124 may be positioned along or adjacent to the flight path 104 to space the drones 124 to the target 110, such as equidistantly spaced apart to the target 110, non-equidistantly spaced apart and biased towards the target 110, non-equidistantly spaced apart and biased towards the shooter, or the like, as explained more fully below.

In some examples, the drones 124 may be positioned based on a mode of the ballistic system 100. For instance, in a standby mode of the ballistic system 100, the drones 124 may hover above the trajectory of the projectile 106 while collecting position (e.g., GPS) and wind data. Depending on the application, the drones 124 may hover between about 1.5 and about 3 times higher than the height of the projectile's trajectory. In some example, the standby mode may be referred to as a stealth mode. For example, the drones 124 may hover well above the projectile's trajectory to provide a stealth characteristic of the drones 124, such as reducing the possibility of an observer hearing and/or seeing the drones 124 from the ground, which may be beneficial in combat situations. In some examples, the drones 124 may emit active frequency waves to jam or hide its own operating and/or communication frequencies. In a combat mode of the ballistic system 100, the drones 124 may lower their altitude to the height of the projectile's trajectory to provide more accurate wind data along the trajectory.

The drones 124 may be positioned by user input or optimally via machine-learning algorithms. For example, the shooter or other operator of the ballistic system 100 may position the drones 124 along the path to the target 110, such as via a controller, as detailed below. In some examples, the drones 124 may be positioned automatically via a machine-learning algorithm or program, the algorithm or program considering terrain, environmental features, flight regulations, and/or concealment directives, among others. In some examples, the drones 124 may have the ability to detect human presence (e.g., through heat sensors) that may trigger an automated altitude adjustment of the drone 124 to enter back in the stealth mode until the threat is gone. In addition, a user (e.g., the shooter) may be alerted of the detected threat, such as through an interface, as explained below.

Figure 5:
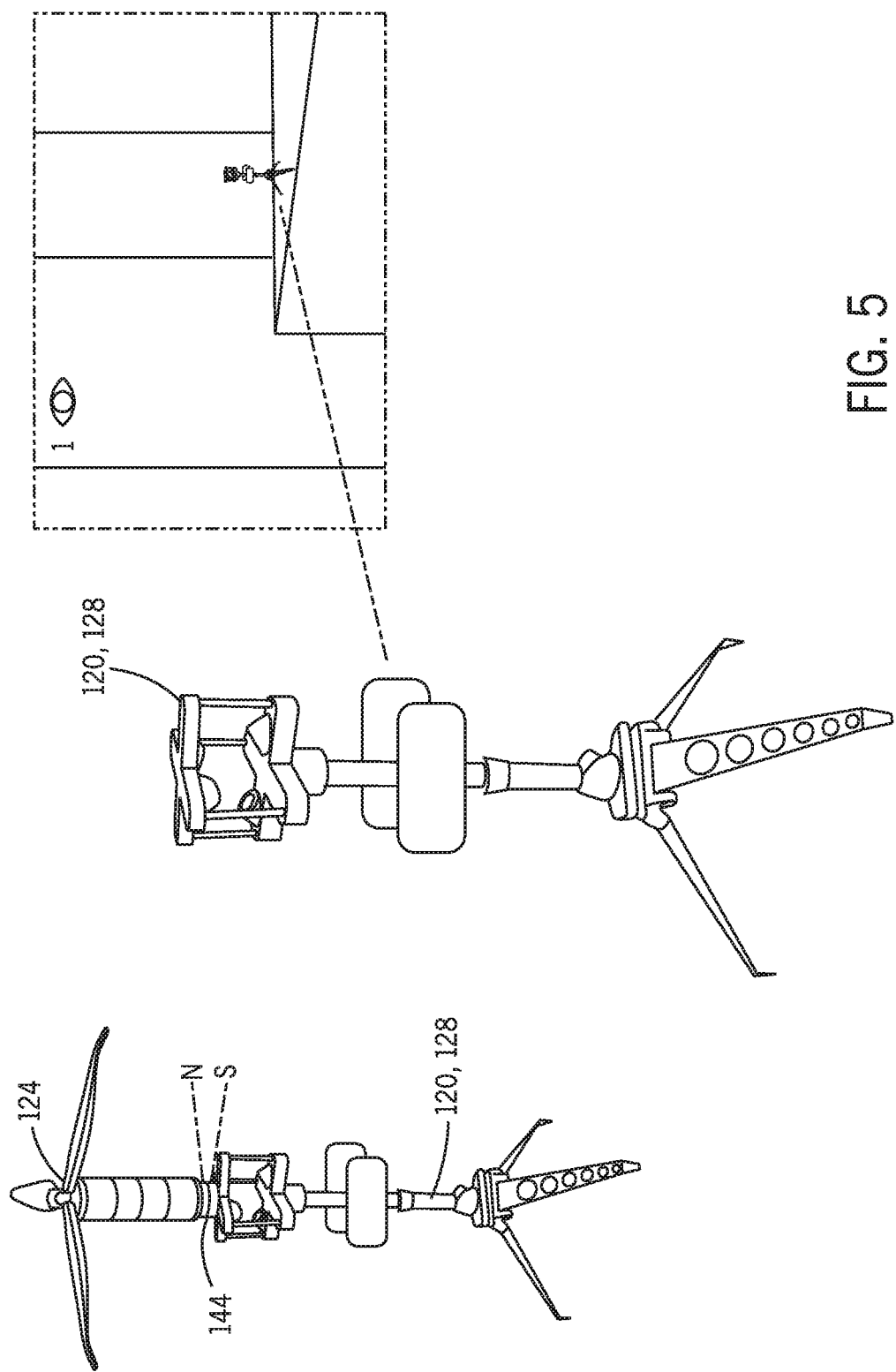
FIG. 5 is a perspective view of a sensor system according to some examples of the present disclosure.

FIG. 5 is a perspective view of a sensor system according to some examples of the present disclosure. Like the drones 124, the remote wind sensor(s) 128 may be placed in desired positions by an operator of the ballistic system 100. In some examples, the remote wind sensors 128 may be placed in desired positions by one or more drones 124. In such examples, the drones 124 may include a cargo platform 144 to lift and place the remote wind sensors 128 in the desired positions along or adjacent to the flight path 104 of the projectile 106, such as to Scene 1 outlined in FIG. 2, among other locations. As shown in FIG. 5, a plurality of drones 124 may be configured to include an airlift cargo platform 144 via a modular field assembly kit. The cargo platform 144 may be configured to lift and place the remote wind sensors 128 at designated spots in the area of operation. For instance, the cargo platform 144 may include a magnetic release and attachment link operable to selectively engage a portion of a remote wind sensor 128. When the remote wind sensor 128 is in a designated spot, the link may be disengaged to place the remote wind sensor 128. The remote wind sensors 128 may be removed from the area of operation in a similar manner. For instance, the cargo platform 144 may be positioned adjacent to a remote wind sensor 128, whereupon the attachment link is activated to engage the remote wind sensor 128 and remove the remote wind sensor 128 from its position.

Referring to FIGS. 1-3, the sensor systems 102 may include at least one static device 150 operable to measure environmental data, such as any combination of wind speed, wind angle, and wind direction. In such examples, the static device 150 may be positioned at or near a launch or firing position. For example, the static device 150 may be placed by the shooter or other operator, or the static device 150 may include a propulsion system to place the static device 150 (e.g., via remote control, automatically, etc.). The static device 150 may be operable to gather both wind data and other environmental data at the launch or firing position (e.g., atmospheric pressure, temperature, etc., as explained above), with the mobile devices 120 gathering only wind data downrange, though other configurations are contemplated. The static device 150 may be configured similarly to the remote wind sensors 128 such that the remote wind sensors 128 and the static device 150 may be interchangeable to facilitate field assembly/deployment. In some examples, the static device 150 may deliver a firing solution (1) as soon as the static device 150 is connected, and (2) while the mobile devices 120 are still on their way to their positions. The mobile devices 120 may gather wind data during flight, delivering a "near perfect" firing solution if time is critical and the shooter cannot wait until the mobile devices 120 have reached their positions.

As described herein, the sensor systems 102 may measure environmental data in respective ballistic segments along the flight path 104 of the projectile 106. For instance, as shown in FIG. 3, the flight path 104 of the projectile 106 may be divided into a plurality of ballistic segments 160, with the number of sensor systems 102 defining the number of ballistic segments 160 along the flight path 104. For instance, deployment of n sensor systems 102 may divide the flight path 104 into n ballistic segments 160, deployment of four sensor systems 102 may divide the flight path 104 into four ballistic segments 160, deployment of two sensor systems 102 may divide the flight path 104 into two ballistic segments 160, deployment of a single sensor system may divide the flight path 104 into a single ballistic segment 160, and so on. In some examples, deployment of n sensor systems 102 may divide the flight path into n+1 ballistic segments. For instance, deployment of n mobile devices 120 may divide the flight path 104 into n+1 ballistic segments 160, such as deployment of three mobile devices 120 dividing the flight path 104 into four ballistic segments 160, deployment of two mobile devices 120 dividing the flight path 104 into three ballistic segments, and so on. Such examples are illustrative only, and deployment of any number of sensor systems 102 may divide the flight path 104 into any number of ballistic segments 160.

The number of sensor systems 102 deployed may depend on a variety of factors. For example, the number of sensor systems 102 deployed may be determined based on the range to the target 110. For instance, longer ranges may necessitate deployment of a greater number of sensor systems 102, with shorter ranges needing smaller numbers of sensor systems 102. The number of sensor systems 102 deployed may be determined based on the needed accuracy and first hit probability. For instance, situations requiring greater accuracy and first hit probabilities (e.g., hostage situations, high value target missions, shooting competitions, etc.) may require a greater number of sensor systems 102 downrange. The number of sensor systems 102 deployed may be determined based on the needed concealment of the shooter. For instance, situations requiring greater concealment (e.g., military sniping operations, hunting, etc.) may require a smaller number of sensor systems 102 downrange. These and other factors may be considered and weighed together to determine the final number of sensor systems 102 deployed downrange.

Referring to FIGS. 1 and 3, the ballistic system 100 may be defined by a single static device 150 and first, second, and third mobile devices 170, 172, 174, though other configurations are contemplated including configurations including nothing but mobile devices 120 positioned downrange (see FIG. 2), configurations where the static device 150 is replaced by another mobile device 120 at or near the firing position of the weapons system 190, configurations including a greater number of sensor systems 102, and configurations including a lesser number of sensor systems 102.

In the illustrative example of FIG. 3, the flight path 104 may be divided into first, second, third, and fourth ballistic segments 180, 182, 184, 186 from the weapons system 190 to the target 110. The first ballistic segment 180 may be defined between the static device 150 and the first mobile device 170, the second ballistic segment 182 may be defined between the first and second mobile devices 170, 172, the third ballistic segment 184 may be defined between the second and third mobile devices 172, 174, and the fourth ballistic segment 186 may be defined between the third mobile device 174 and the target 110. In such examples, the environmental data measured by the static device 150 may be used for ballistic calculations of the projectile 106 within the first ballistic segment 180. In like manner, the environmental data measured by the first mobile device 170 may be used for ballistic calculations of the projectile 106 within the second ballistic segment 182, the environmental data measured by the second mobile device 172 may be used for ballistic calculations of the projectile 106 within the third ballistic segment 184, and the environmental data measured by the third mobile device 174 may be used for ballistic calculations of the projectile 106 within the fourth ballistic segment 186.

In such examples, each ballistic segment 180, 182, 184, 186 may be regarded as an independent shot, with each shot following a different ballistic behavior, such as originating from a different projectile speed, including a different ballistic coefficient, and so on. Based on the positions of the sensor systems 102 relative to the weapons system 190, the velocities (and other properties) of the projectile 106 at these positions, the real time wind data gathered by the sensor systems 102, as well as other required ballistic and environmental data and/or inputs, ballistic calculations of the projectile 106 within each ballistic segment 180, 182, 184, 186 may be calculated, as detailed below. Depending on the application, the ballistic calculations of each ballistic segment 180, 182, 184, 186 may occur simultaneously and in real time. As explained in detail below, the final ballistic calculations and compensation values may be the result of a mathematical calculation or algorithm based on the data of each ballistic segment 180, 182, 184, 186.

The sensor systems 102 may include other features for convenience. For example, the sensor systems 102 may include communication links to transmit and receive data and instructions. Particularly, the sensor systems 102 may transmit the measured environmental data to a centralized system or receiver. In some examples, the sensor systems 102 may transmit their positions to the centralized system or receiver or to other systems and devices. As explained more fully below, the sensor systems 102 may transmit the measured environmental data either decrypted or encrypted via wireless communication, wired communication, or optical communication, among others. In some examples, the sensor systems 102 may be operable to communicate with each other to pass or relay information and/or data to one another or to the centralized system or receiver. In this manner, signal emissions and/or the operational footprint may be limited in the area of operation, which may be desirable under certain conditions. In some examples, the sensor systems 102 may include one or more memory chips operable to store, among others, executable commands, operating systems, and the measured environmental data. In such examples, the stored environmental data may be downloaded from the sensor systems 102 for analysis, local environment wind mapping, and other data logging.

In some examples, the sensor systems 102 may include safety features limiting undesired transmission and/or capture by others. For instance, each sensor system 102 may include a nano-charge, a phosphor ignition system, an electrical short circuit mechanism, or other destruction application or system allowing the sensor system 102 to be destroyed remotely, such as by the centralized system or control. Depending on the application, the destruction application may be activated during each engagement such that the sensor systems 102 are considered disposable.

Figure 6:
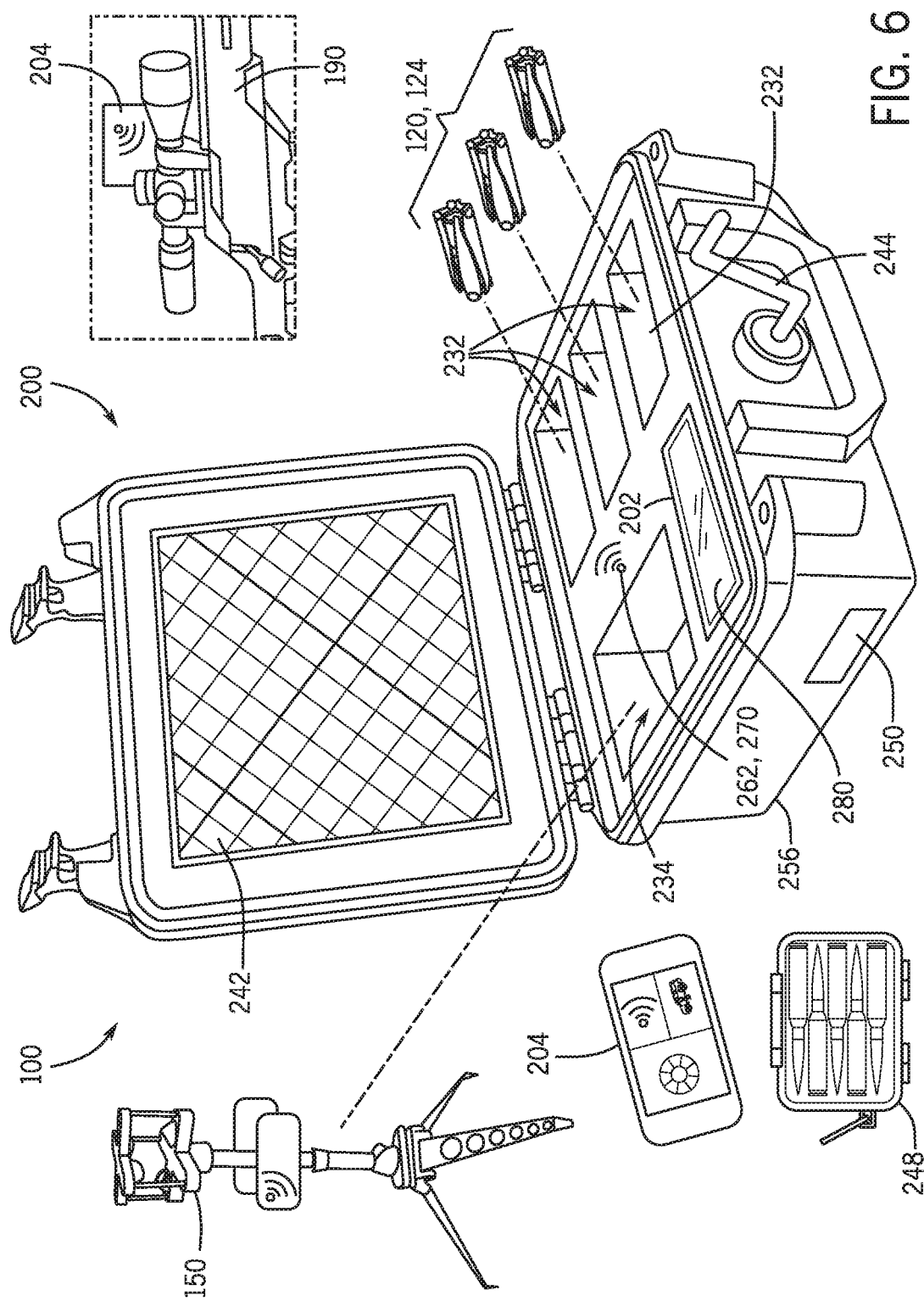
FIG. 6 is a representative view of a ballistic system according to some examples of the present disclosure.

FIG. 6 is a representative view of the ballistic system 100 according to some examples of the present disclosure. As shown, the ballistic system 100 includes a mission control system 200 with a ballistic computer 202 and a data interface 204. The ballistic computer 202 may be in data communication with the sensor systems 102 to receive the environmental data measurements detected by the sensor systems 102. For instance, the ballistic computer 202 may receive the environmental data from the sensor systems 102 via wireless communication, wired communication, optical communication, or any combination thereof. Depending on the application, the ballistic computer 202 may receive the environmental data from each sensor system individually. In some examples, the ballistic computer 202 may receive the environmental data as the data is relayed from one sensor system 102 to another. For instance, the gathered environmental data may be relayed back to the ballistic computer 202 in sequential fashion starting with the sensor system 102 furthest from the ballistic computer 202. In the example of FIG. 3, the environmental data gathered by the third mobile device 174 may be relayed to the ballistic computer 202 through the second and first mobile device 172, 170, in that order, the environmental data gathered by the second mobile device 172 may be relayed to the ballistic computer 202 through the first mobile device 170, and the environmental data gathered by the first mobile device 170 may be relayed to the ballistic computer 202 directly from the first mobile device 170. In some examples, the data may be stacked together in a single packet, such as the data transmitted from the second mobile device 172 to the first mobile device 170 includes the combined environmental data measured by both the second and third mobile devices 172, 174, and the data transmitted from the first mobile device 170 to the ballistic computer 202 includes the combined environmental data measured by the first, second, and third mobile devices 170, 172, 174. Other configurations of data transfer are contemplated.

As described herein, the ballistic computer 202 is configured to perform real-time ballistic calculations of the projectile 106 along its flight path 104 based at least on the environmental data received from the sensor systems 102. For instance, based on at least the wind data received from the sensor systems 102 or other internal or external applications that measure ballistic and environmental factors, the ballistic computer 202 is configured to calculate a wind compensation value 220 for the projectile 106 to hit a desired target 110, the wind compensation value 220 accounting for horizontal drift of the projectile 106 at the target's distance.

Based on at least other environmental data received from the sensor systems 102, the ballistic computer 202 may be configured to calculate an elevation compensation value 222 for the projectile 106 to hit a desired target 110, the elevation compensation value 222 accounting for vertical drop of the projectile 106 at the target's distance. The wind and elevation compensation values 220, 222 may be determined by the ballistic calculator using conventional ballistic calculations, using any number of factors. For example, along with distance, projectile velocity, wind data, temperature, atmospheric pressure, humidity, and altitude, or any combination thereof, the ballistic computer 202 may account for shooting position and target location (e.g., slant angle measurements, Coriolis Effect, etc.) as well as other factors (e.g., spin drift, powder temperature, zero conditions, etc.). As noted above, the wind and elevation compensation values 220, 222 may be determined through a mathematical or algorithmic calculation using the ballistics within the individual ballistic segments 160.

The compensation values 220, 222 calculated by the ballistics computer 202 may be displayed on the data interface 204. The data interface 204 may include many configurations operable to display the calculated compensation values 220, 222. For instance, the data interface 204 may be a digital display mounted on the weapons system 190 such that the compensation values 220, 222 are displayed within the shooter's line of vision, as explained below. In some examples, the data interface 204 may be integrated with, embodied as, or interface with a mobile electronic device. For instance, the compensation values 220, 222 (as well as other data, images, commands, or information) may be presented to the shooter via an application running on the mobile electronic device. In some examples, the data interface 204 may display imagery of the shooting scene, a map view of the shooting scene, an overlay of the positions of the sensor systems 102, a projected flight path of the projectile 106, a threat level indication, a target distance, a target confirmation, or the like. In some examples, the data interface 204 may control one or more parameters of the mission control system 200. For example, the shooter or other user of the ballistic system 100 may control or adjust the drones 124 (e.g., a position of the drones 124, a mode of the drones 124, a camera position/focus of the drones 124, etc.) via the data interface 204 (e.g., via an application running on a mobile electronic device).

The compensation values 220, 222 may be presented as desired by a user/shooter. For instance, the elevation compensation value 222 may be presented in distance (e.g., inches), minutes of angle (MOA), mils, clicks, wind dots (e.g., TREMOR 3), or Mil-Dots, among others. Similarly, the wind compensation value 220 may be presented in distance (e.g., inches), MOA, mils, clicks, wind dots (e.g., TREMOR 3), or Mil-Dots, among others. The compensation values 220, 222 may correlate to respective adjustments to be made in a scope or other aiming system. For instance, after the ballistic computer 202 determines the wind compensation value 220, the user/shooter may adjust the scope based on the determined wind compensation value 220 (e.g., the scope will be adjusted 5 MOA for a wind compensation value of 5 MOA, the scope will be adjusted to account for calculated wind drift at a particular range, etc.). in some examples, the scope may automatically adjust itself based on the calculated wind compensation value 220 and/or elevation compensation value 222. For instance, the scope may be in data communication (e.g., wired, wireless, etc.) with the ballistic computer 202 to receive the compensation value(s) determined by the ballistic computer 202. Once the scope receives the compensation value, the scope may adjust its reticle automatically based on the detected environmental data, projectile ballistics, target direction, and target distance. In other examples, the wind compensation value 220 and/or elevation compensation value 222 may be presented to the user, whereupon the user determines and makes the amount of reticle adjustment needed, if any.

The mission control system 200, which may be referred to as "BOX," may include other features for convenience. For instance, the mission control system 200 may provide a take-off and landing platform for the drones 124. In some examples, the mission control system 200 may include one or more storage compartments 232 to receive the sensor systems 102 for transport and/or storage, such as a static sensor storage compartment 234 for storing the static device 150 and one or more drone storage compartments 236 for storing the drones 124. In some embodiments, the mission control system 200 may include a power module 238 operable to charge the sensor systems 102. For instance, the power module 238 may include one or more rechargeable batteries operable to charge the sensor systems 102 once electrically connected (e.g., wired connection, wireless charging, inductive charging, etc.). In some examples, the rechargeable batteries may be electrically connected to a power source, such as a solar module 242, car cigarette charger, or other external power source, to recharge the batteries. In such examples, the solar module 242 may be detachable to place in a desired location (e.g., away from the concealed position of the shooter). For example, the solar module 242 may be associated with a detachable lid of an enclosure. In some examples, the batteries may be recharged through rotation of a hand crank 244 and/or through one or more piezoelectric circuits that convert mechanical energy into electrical energy (e.g., through a built-in generator that converts the movement of the mission control system 200 (e.g., through walking) into electrical energy). The mission control system 200 may include a temperature-controlled ammunition compartment 248. In some examples, the power module 238 may include a power outlet 250 to charge one or more devices of the ballistic system 100 (e.g., the static device 150, the data interface 204, the ammunition compartment 248, etc.) or other electronic devices (e.g., a user's smartphone, a backup weather meter, etc.). As shown, the mission control system 200 may be contained within a portable container 256, such as a tactical box, which may be referred to as a system housing.

The mission control system 200 may include a communications module 262 operable to transmit instructions to and receive data from the plurality of sensor systems 102. The communications module 262 may receive and transmit data via wireless communication protocols (e.g., Bluetooth, Wi-Fi, cellular, radio frequency, near field communication, etc.), wired communication, or optical communication, among others. In some examples, the communications module 262 may include encryption protocols to encrypt/decrypt the communications between the mission control system 200 to the sensor systems 102.

In some examples, the mission control system 200 may include an interlink module 270 in data communication with external devices or applications. For instance, the interlink module 270 may provide a communications pathway between the mission control system 200 and one or more external devices or applications, such as laser range finders, slant angle measurement devices, storage mediums, display devices (e.g., the data interface 204), data feeds, etc. The interlink module 270 may also provide a communications link between rescue operations/personnel and the ballistic system 100 and/or user. For instance, the interlink module 270 may communicate a pick-up location to rescue personnel, if needed. Like the communications module 262, the interlink module 270 may receive and transmit data via wireless communication protocols (e.g., Bluetooth, Wi-Fi, cellular, radio frequency, near field communication, etc.), wired communication, or optical communication, among others, whether encrypted or not.

In some examples, the mission control system 200 may include a flight module 280 configured to control drone flight. The flight module 280 may calibrate the flight paths of the drones 124 relative to the mission control system 200 and the direction of fire. For instance, the flight module 280 may calculate preferred locations to place the mobile devices 120 along or adjacent to the flight path 104 of the projectile 106 based on at least one of local topography, shooting position, and target location, etc. In one aspect, the user may designate the preferred location of the drones 124. In another aspect, the preferred locations may be suggested to the user. For instance, the preferred locations may correlate to areas within the area of operation where wind fluctuations or peaks may be the greatest (e.g., adjacent to a peak between the shooting position and the target 110, within a narrowing canyon along the projectile's flight path 104, etc.). The user may accept or modify the calculated locations, with the accepted or modified locations programmed into the mobile devices 120. In some examples, the locations may be calculated automatically without any user input or feedback.

The flight paths of the drones 124 may be determined based on a variety of factors. For instance, the flight paths may be determined with concealment of the sensor systems 102 and/or the user/shooter as a top priority. In one example, the flight paths may be calculated to limit silhouetting the sensor systems 102 in the sky (e.g., map of earth flying using 3D maps), thereby limiting identification of the sensor systems 102 by the target 110. In another example, the flight paths may be calculated to limit tracking of the sensor systems 102 back to the shooting position. For example, the flight module 280 may program the drones 124 to fly in random patterns from the shooting position to their final observation positions, thereby limiting identification of the shooting position by the target 110. Once firing operations are complete, the mobile sensor systems 102 may return automatically to the landing platform of the mission control system 200, either directly or via one or more deceptive flight paths (e.g., random direction or escaping a local observers vision by approaching from or laving via high altitude flight path).

Figure 7:
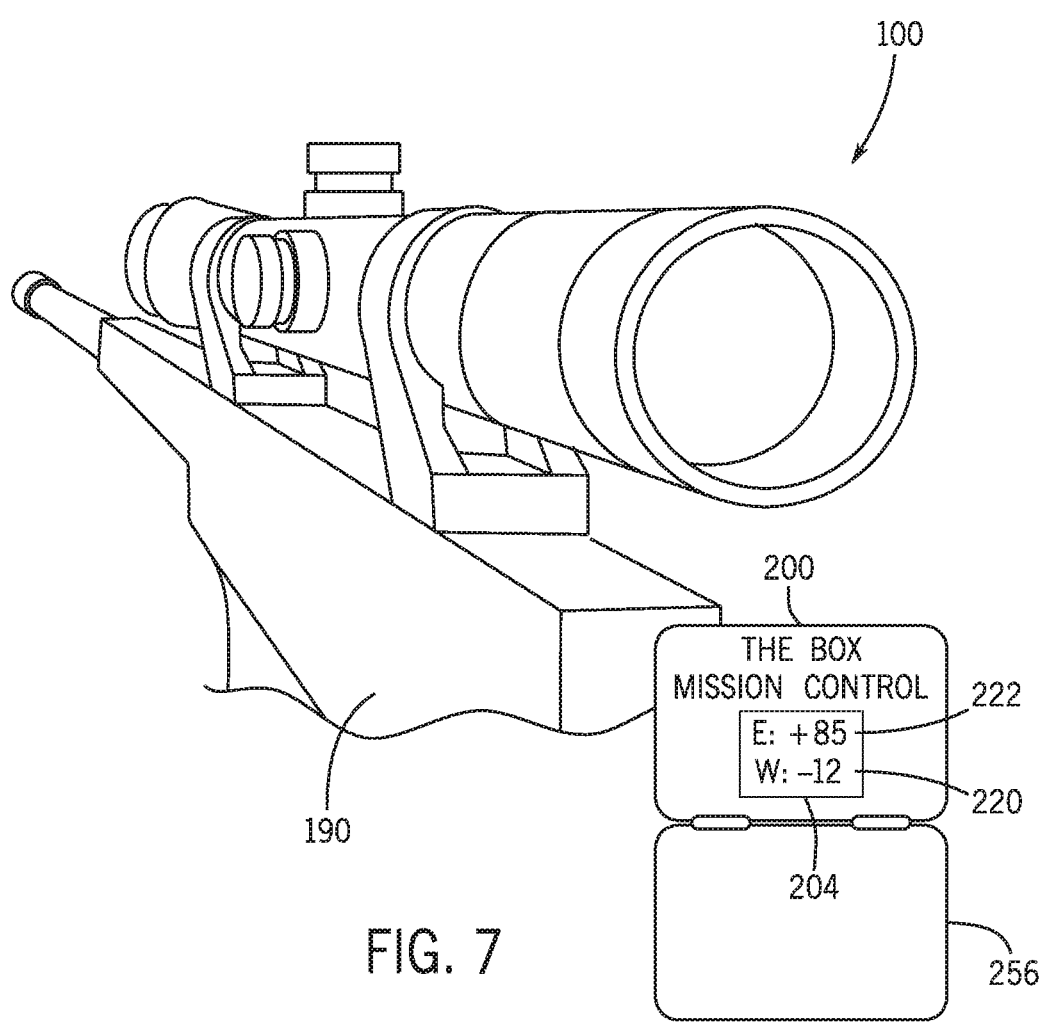
FIG. 7 is a representative view of a first data interface according to some examples of the present disclosure.
Figure 8B:
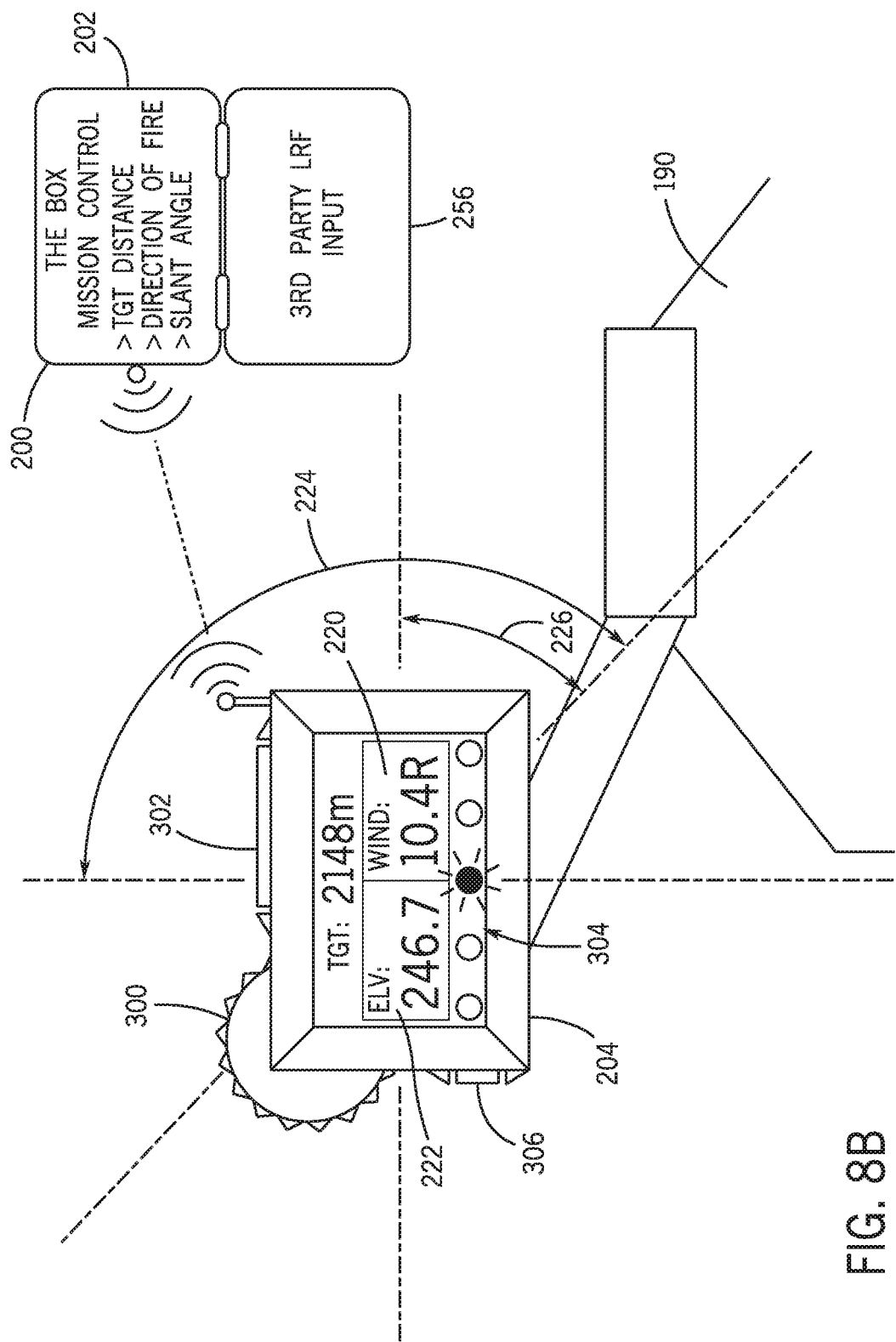
FIG. 8B is a second representative view of the second data interface of FIG. 8A according to some examples of the present disclosure.
Figure 9:
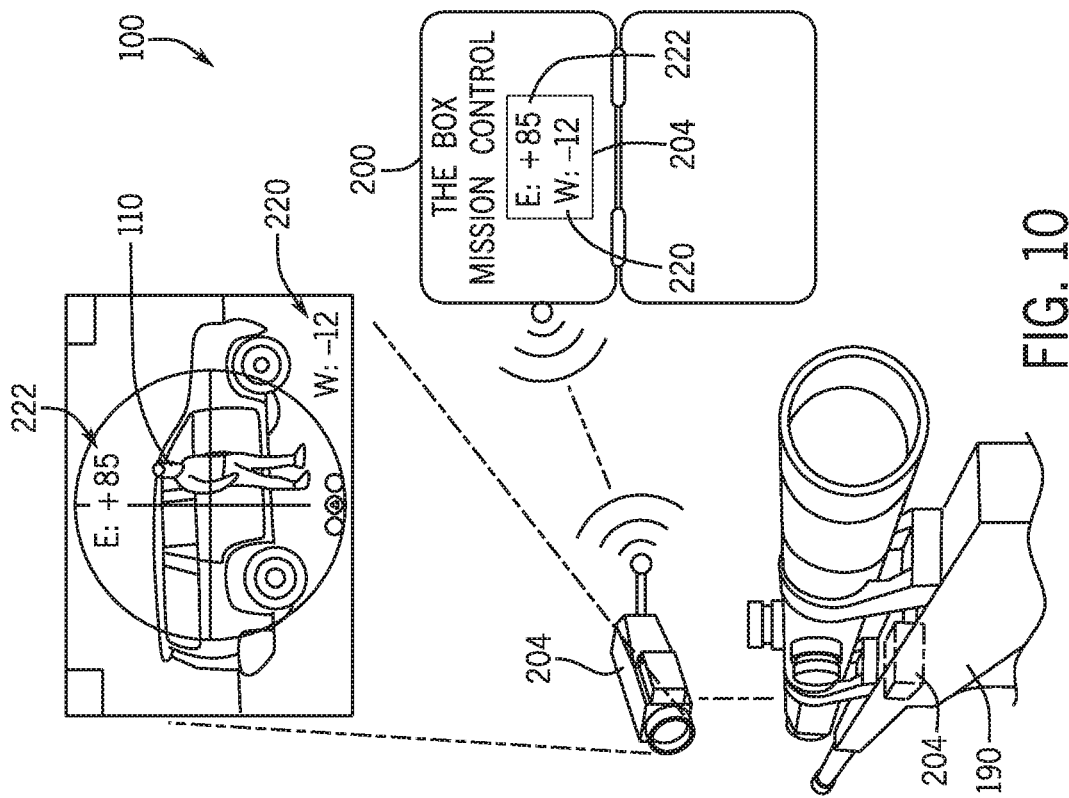
FIG. 9 is a representative view of a third data interface according to some examples of the present disclosure.
Figure 10:
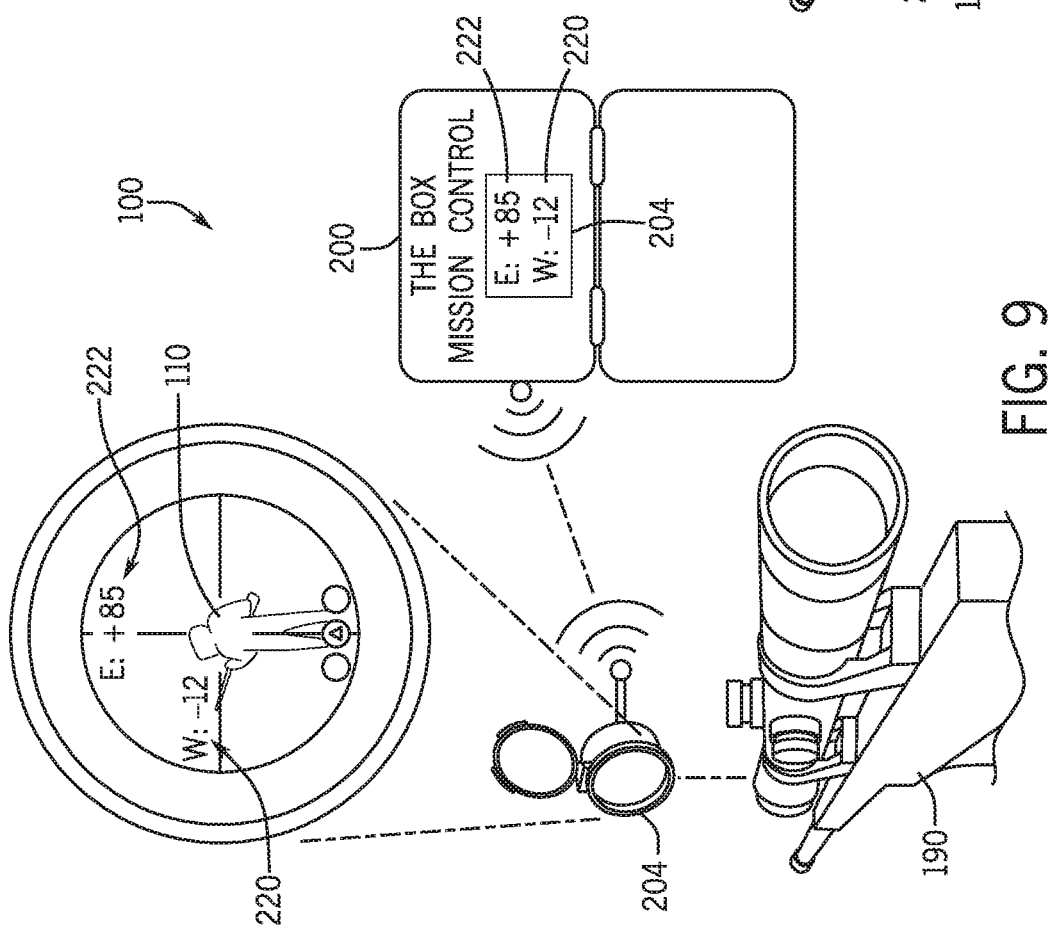
FIG. 10 is a representative view of a fourth data interface according to some examples of the present disclosure.
Figure 11:
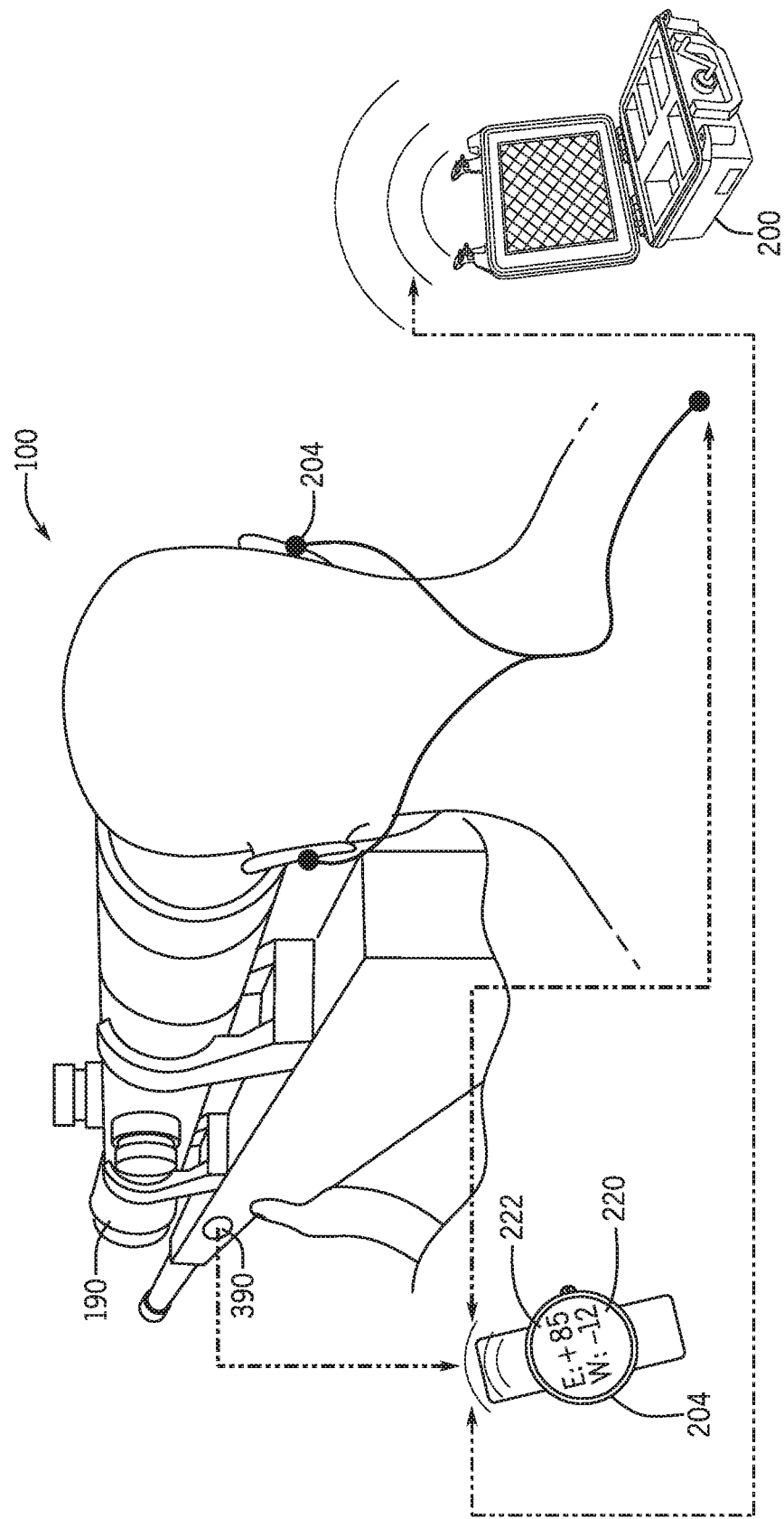
FIG. 11 is a representative view of a fifth data interface according to some examples of the present disclosure.

FIG. 7 is a representative view of a first data interface according to some examples of the present disclosure. FIG. 8A is a first representation of a second data interface according to some examples of the present disclosure. FIG. 8B is a second representation of the second data interface of FIG. 8A. FIG. 8C is a third representation of the second data interface of FIG. 8A. FIG. 9 is a representative view of a third data interface according to some examples of the present disclosure. FIG. 10 is a representative view of a fourth data interface according to some examples of the present disclosure. FIG. 11 is a representative view of a fifth data interface according to some examples of the present disclosure. Referring to FIGS. 7-11, the data interface 204 may be any device or system in data communication with the ballistic computer 202 to output one or more of the compensation values 220, 222 calculated by the ballistic computer 202. For instance, the data interface 204 may display at least one of the wind compensation value 220 and the elevation compensation value 222 to a user. In some examples, the data interface 204 may alert the user acoustically of the calculated compensation value(s) (see FIG. 11). For instance, the user may by audibly alerted, such as over an earpiece, of the calculated compensation value(s) 220, 222, warnings, shot timers, or other data. In such examples, there may be a wired or wireless connection between the earpiece and the mission control system 200. The compensation value(s) 220, 222 may be presented to the user, either visually or acoustically, in a timed loop (e.g., on a 5 second loop, on a 10 second loop, etc.), when the sensor systems 102 notice a change in environmental factors/conditions, or on demand. For instance, as shown in FIG. 11, a data request button 390 may be mounted or strapped to the weapons system 190, the data request button 390 wired or wirelessly connected to the data interface 204 (e.g., a smart watch). The data interface 204 may also measure a slant angle 224 and direction of fire 226 of the weapons system 190, with the slant angle and direction of fire measurements transmitted to the ballistic computer 202 for use in ballistic calculations. The data interface 204 may also measure and provide visual feedback to the shooter regarding the measured slant angle or weapon tilt, as explained below. Depending on the application, the data interface 204 may be wired or wirelessly connected to the ballistic computer 202 and may be defined by one or more separate devices.

The data interface 204, which may be referred to as a coordinator, may include many configurations. For instance, as shown in FIG. 7, the data interface 204 may be a digital display of the ballistic computer 202, such as mounted on the mission control system 200. The data interface 204 may display at least the wind compensation value 220, such as both the wind compensation value 220 and the elevation compensation value 222. In such examples, the shooter may adjust the scope of the weapons system 190 per the compensation value(s) displayed in the data interface 204.

As shown in FIGS. 7A-7C, the data interface 204 may be a digital display mounted on the weapons system 190. For instance, the digital display may be mounted to a picatinny rail of the weapons system 190, such as via a rail adapter. In such examples, the data interface 204 may be positioned within the shooter's sight picture. For example, the data interface 204 may be positioned adjacent to the scope of the weapons system 190 such that the compensation values 220, 222 displayed by the data interface 204 are visible to the shooter as the shooter views the target 110 through the scope (see FIG. 7C). As shown in FIG. 7C, the data interface 204 may be positioned about the bottom left portion of the scope, about the bottom right portion of the scope, or about a top portion of the scope depending on the application or the preference of the shooter.

With continued reference to FIGS. 7A-7C, the data interface 204 may include a distance wheel 300 rotatably mounted to the exterior of the data interface 204. The shooter may actuate the distance wheel 300 to set the distance to the target 110. For instance, the shooter may rotate the distance wheel 300 until the correct distance to the target 110 is displayed in the data interface 204. For example, the distance wheel 300 may be rotated in a first direction (e.g., clockwise in FIG. 7B) to increase the displayed distance or may be rotated in an opposite second direction (e.g., counterclockwise in FIG. 7B) to decrease the displayed distance.

Once the correct or desired distance is displayed in the data interface 204, the shooter may press a target button 302 on the data interface 204 (e.g., on top of the data interface 204). Once the target button 302 is pressed, the ballistic solution may be calculated and the corresponding compensation values 220, 222 displayed in the data interface 204. As shown, the ballistic solution may account for the slant angle of the weapons system 190, the direction of fire of the weapons system 190, the tilt of the weapons system 190, and the like at the moment the target button 302 is pressed.

The data interface 204 may include other features for convenience. For instance, the data interface 204 may include a tilt sensor 304 that provides real-time feedback to the shooter of the sideways cant of the weapons system 190. For example, the tilt sensor 304 may include a plurality of LEDs that provide a visual representation of the cant of the weapons system 190, such as a left most LED illuminating if the weapons system 190 is canted to the right, a right most LED illuminating if the weapons system 190 is canted to the left, a center LED illuminating if the weapons system 190 is level (i.e. not canted to the left or to the right), etc. In some examples, the data interface 204 may include one or more buttons 306 to adjust the brightness of the data interface's display, such as a first button to increase the display's brightness and a second button to decrease the display's brightness. In some examples, the display may be recessed within the data interface 204 to limit display light emission into the environment or the shooter's face.

As shown in FIG. 9, the data interface 204 may include a holographic lens where one or more compensation values 220, 222 are displayed within the shooter's line of vision. In one example, the holographic lens may be incorporated into a flash filter attached to the objective lens of a scope. As shown in FIG. 10, the data interface 204 may be incorporated into a thermal imaging or night vision sight. Like the holographic lens, one or more compensation values 220, 222 may be displayed within the shooter's line of vision through the thermal imaging or night vision sight.

Figure 17:
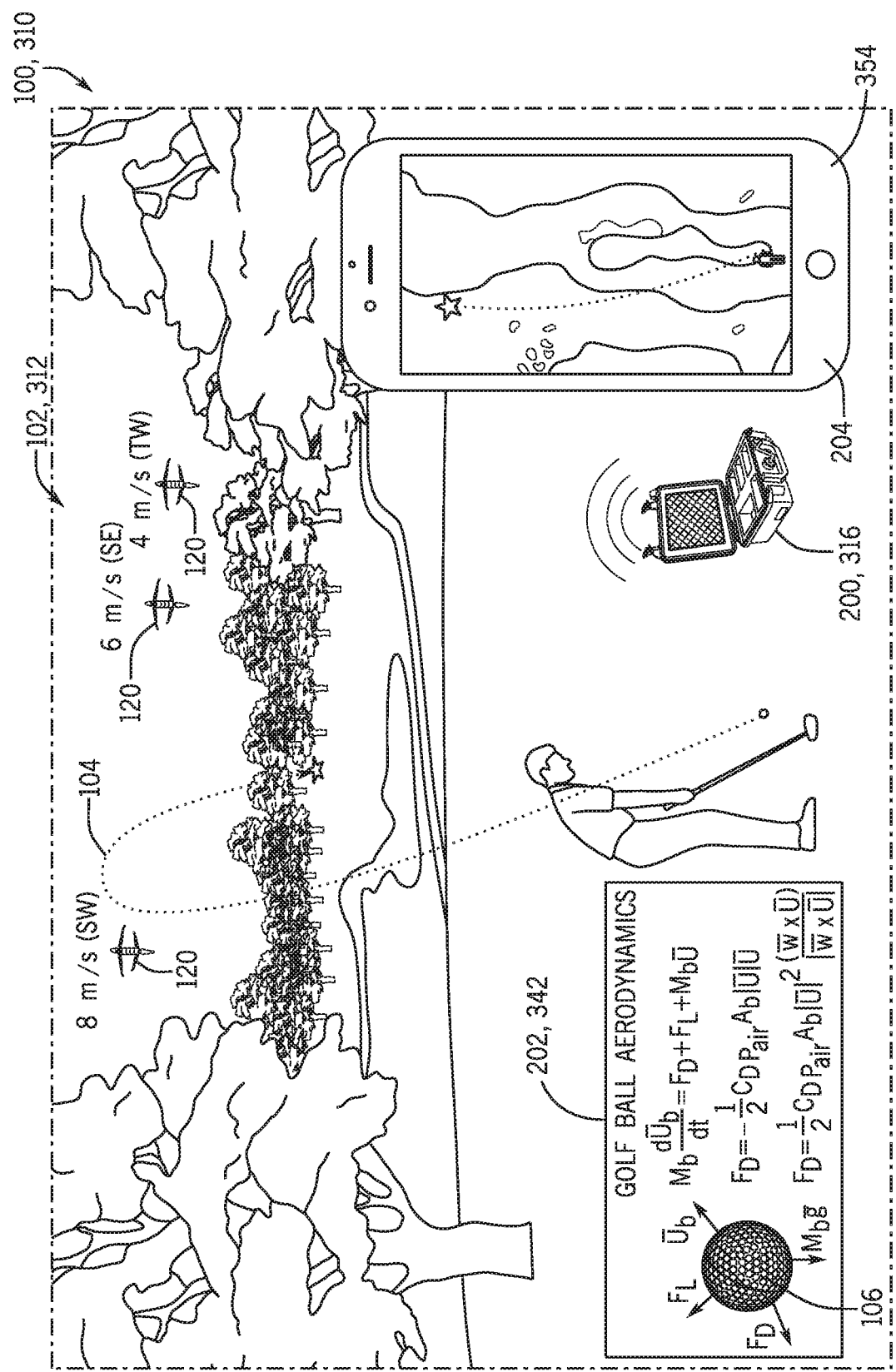
FIG. 17 is a representative view of a ballistic system used in a sporting application according to some examples of the present disclosure.
Figure 18:
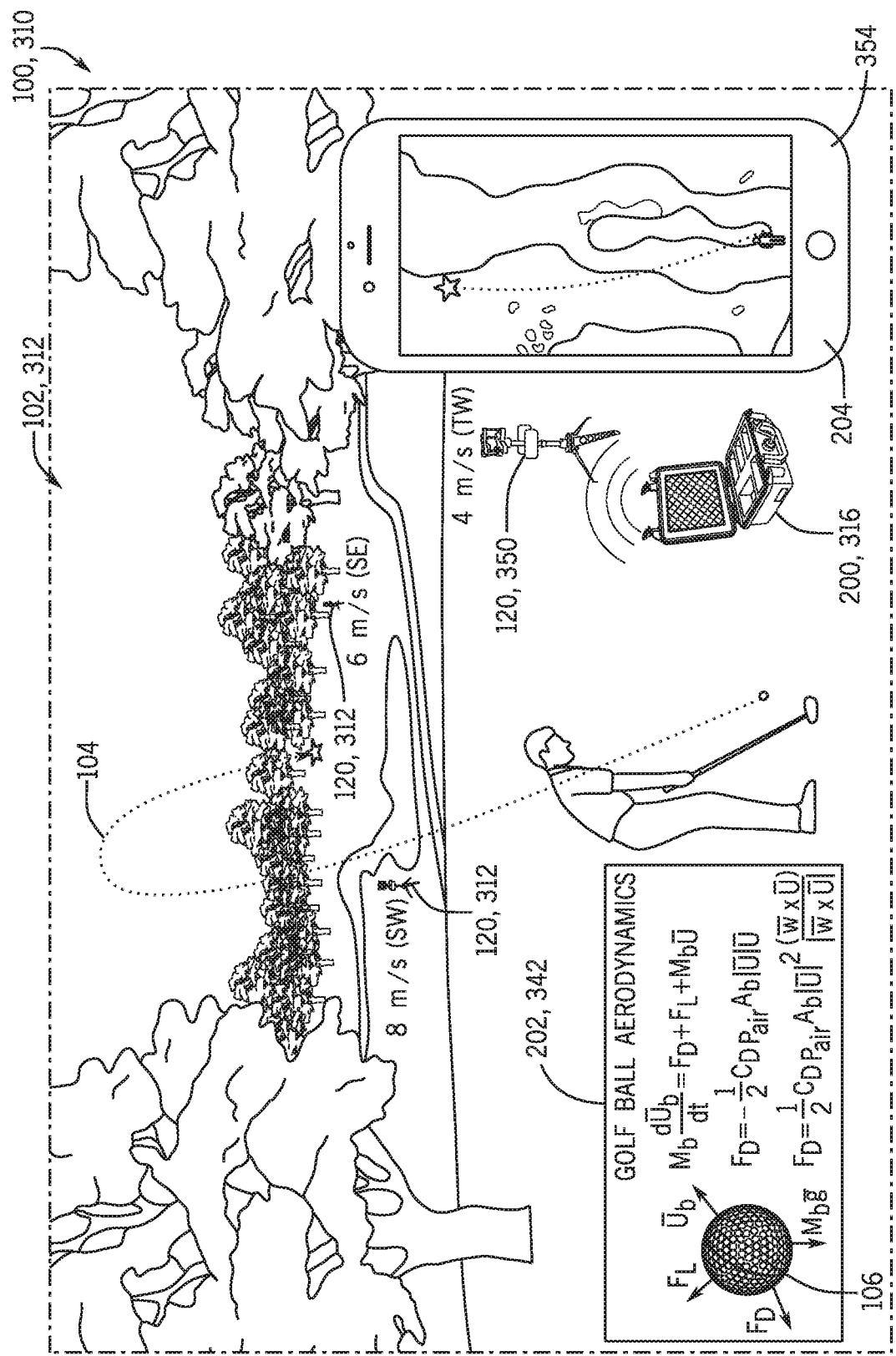
FIG. 18 is a representative view of another ballistic system used in a sporting application according to some examples of the present disclosure.

Referring to FIG. 11, the data interface 204 may be provided by a portable electronic device, such as a smartphone, tablet, sunglasses, smart watch, or other electronic device (see also FIGS. 17 and 18). In such examples, the ballistic system 100 may interface with an application running on the electronic device. Such embodiments are given by way of example only, and the data interface 204 may include other configurations. For instance, the data interface 204 may display the compensation value(s) 220, 222 on a heads-up display (HUD). In some examples, the ballistic system 100 may include a plurality of data interfaces 204 each displaying the wind compensation value 220 and/or the elevation compensation value 222 for redundancy purposes. For example, as shown in FIGS. 9 and 10, one or more data interfaces 204 may be mounted to the weapons system 190 with an additional data interface 204 mounted within the system housing 256 of the mission control system 200.

Figure 12A:
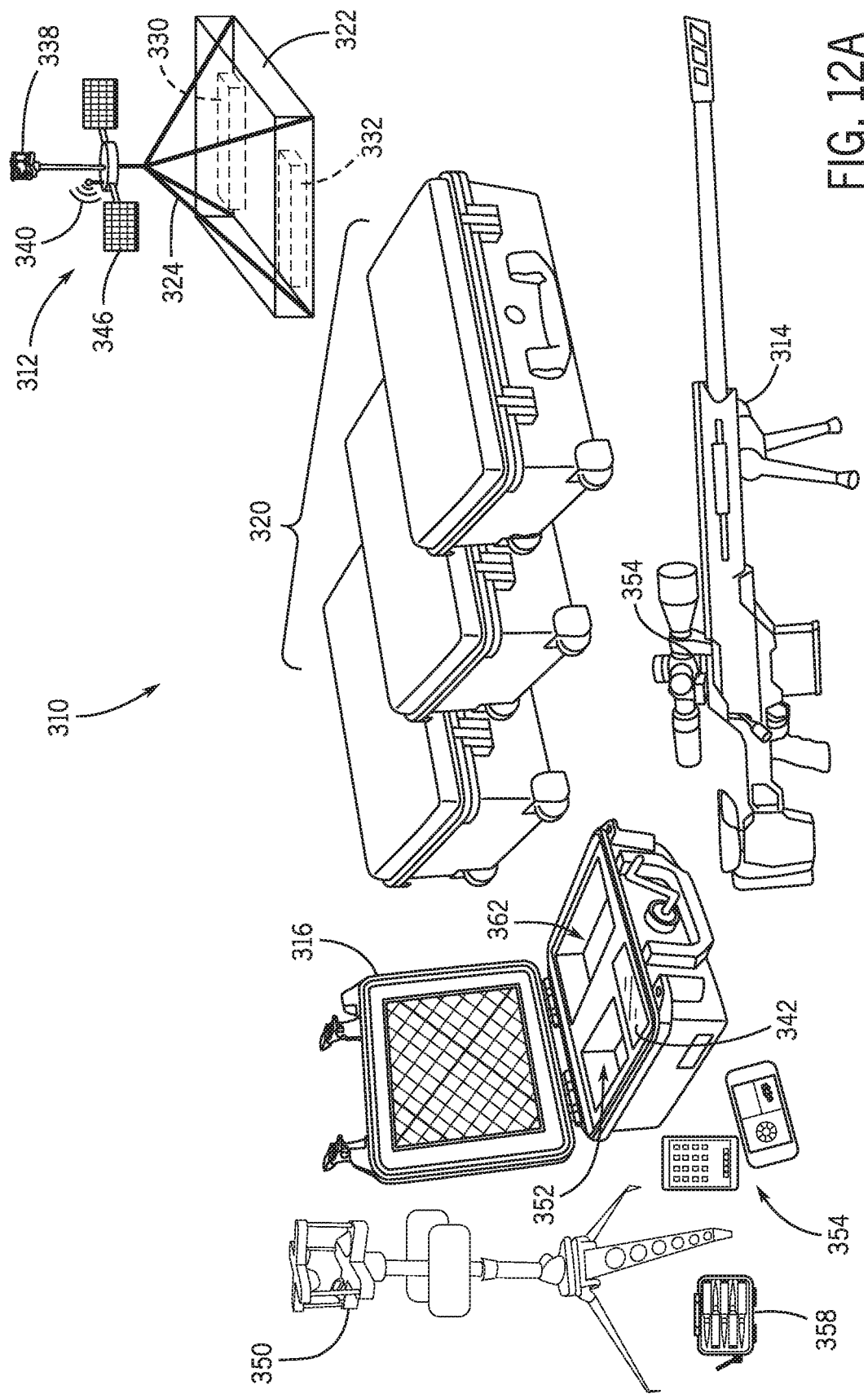
FIG. 12A is a representative view of another ballistic system according to some examples of the present disclosure.
Figure 12B:
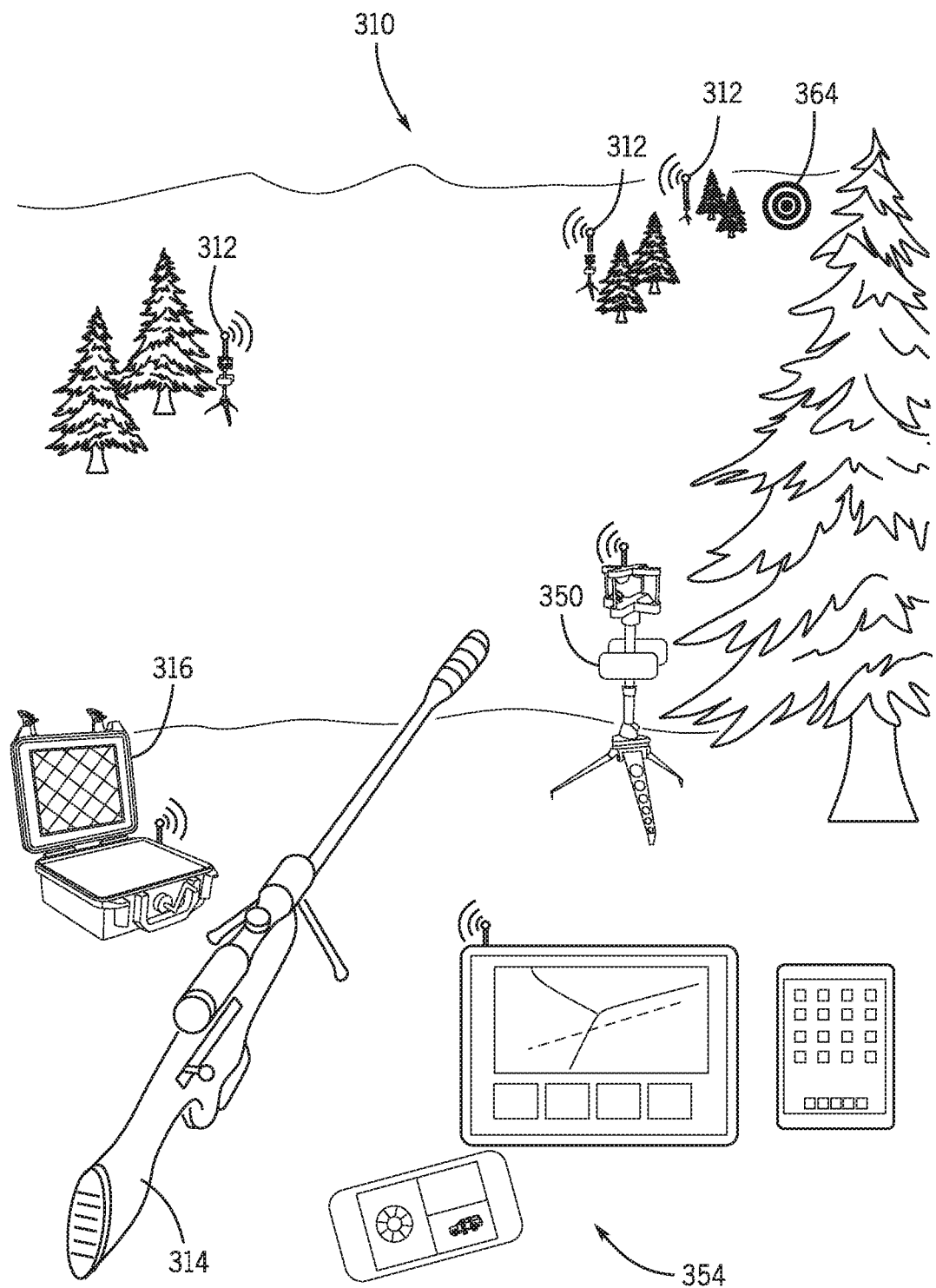
FIG. 12B is a representative view of the ballistic system of FIG. 11 during use according to some examples of the present disclosure.

FIG. 12A is a representative view of another ballistic system 310 according to some examples of the present disclosure. FIG. 12B is a representative view of the ballistic system 310 during use according to some examples of the present disclosure. Unless otherwise noted below, the ballistic system 310 may be similar to the ballistic system 100 described above, or vice versa. For instance, the ballistic system 310 may include one or more sensor systems 312 operable to measure environmental data along a flight path of a projectile fired from a weapons system 314 and a mission control system 316 for performing real-time ballistic calculations of the projectile along its flight path based at least on the environmental data measured by the one or more sensor systems 312. In this manner, the sensor systems 312, weapons system 314, and mission control system 316 may be similar to the sensor systems 102, weapons system 190, and mission control system 200 described above.

Referring to FIG. 12A, each sensor system 312 may be static station for placement along the flight path of the projectile, such as at one or more positions at a shooting range. Each sensor system 312 may be housed within a respective enclosure 320. In this manner, the ballistic system 310 may be portable. Each sensor system 312 may include a base 322 that supports the sensor system 312 when positioned on the ground. Depending on the application, the base 322 may be rigid (e.g., hard-sided case, etc.) or deformable (e.g., soft-side bag, etc.). As shown, the sensor system 312 may include a stand 324 extending from the base 322. The stand 324 may be deployable from and/or collapsible within the base 322 for compact storage and transport.

The sensor system 312 may include a battery 330 and one or more electronics 332 positioned within the base 322. The battery 330 may be rechargeable and may power the one or more electronics 332 and other electronic modules of the sensor system 312. The electronics 332 may include any number of processors, logic structures, memories, or circuits that enable the sensor system 312 to gather, determine, interpret, and store environmental data, among others.

The sensor system 312 may include one or more sensors, devices, or modules connected or connectable to the stand 324. For example, the sensor system 312 may include a wind sensor 338 configured to collect wind data similar to the wind sensors of the drone 124, described above. Depending on the application, the wind sensor 338 may be connected to a telescoping portion of the stand 324 to adjustably position the wind sensor 338 as desired, such as to reach the projectile's trajectory. The sensor system 312 may include communications device 340 configured to send and receive data and commands. For example, the communications device 340 may send gathered wind data to a ballistics computer 342 of the missions control system 316. In some examples, the sensor system 312 may include a GPS module 344 that measures the relative or absolute position of the sensor system 312. In some examples, the sensor system 312 may include one or more solar panels 346 to recharge the battery 330.

As shown in FIG. 12A, the ballistic system 310 may include other features similar to the ballistic system 100. For instance, the ballistic system 310 may include a static wind sensor 350 configured similar to the static device 150 described above, the static wind sensor 350 storable within a first storage compartment 352 of the mission control system 316. The ballistic system 310 may also include a data interface 354 associated with the weapons system 314 and/or embodied as a mobile electronic device for displaying a ballistic solution calculated by the ballistics computer 342 (e.g., a wind compensation value, an elevation compensation value, etc.) to the shooter. The ballistic system 310 may also include a temperature-controlled ammunition compartment 358 similar to ammunition compartment 248.

In some examples, the ballistic system 310 may include a velocity detector 360 configured to measure or otherwise determine the muzzle velocity of the projectile from the weapons system 314. The velocity detector 360 may be a chronograph utilizing visual, frequency, and/or electromagnetic detection technology to measure the velocity of the projectile when fired from the weapons system 314. In such examples, the velocity detector 360 may be storable within a second storage compartment 362 of the mission control system 316.

Referring to FIG. 12B, the ballistic system 310 may be deployable to gather environmental data along a path to a target 364. For example, the static wind sensor 350 may be positioned at or near a firing position of the weapons system 314, and one or more sensor systems 312 may be positioned downrange. Depending on the application, the sensor systems 312 may be temporarily, semi-permanently, or permanently positioned. For instance, the sensor systems 312 may be configured for long-term placement at a dedicated shooting range. Although three sensor systems 312 are shown deployed in FIG. 12B, the ballistic system 310 may include any number of sensor systems 312. In some examples, the sensor systems 312 may be plug-and-play, with a shooter selecting the number of desired sensor systems 312 to include in ballistic calculations (e.g., via an application running on a mobile electronic device). For example, the shooter may select all the sensor systems 312 downrange or less than all of the sensor systems 312 downrange. In some examples, the sensor systems 312 may be on a network such that multiple shooters can access and use the data gathered by the sensor systems 312.

Figure 13:
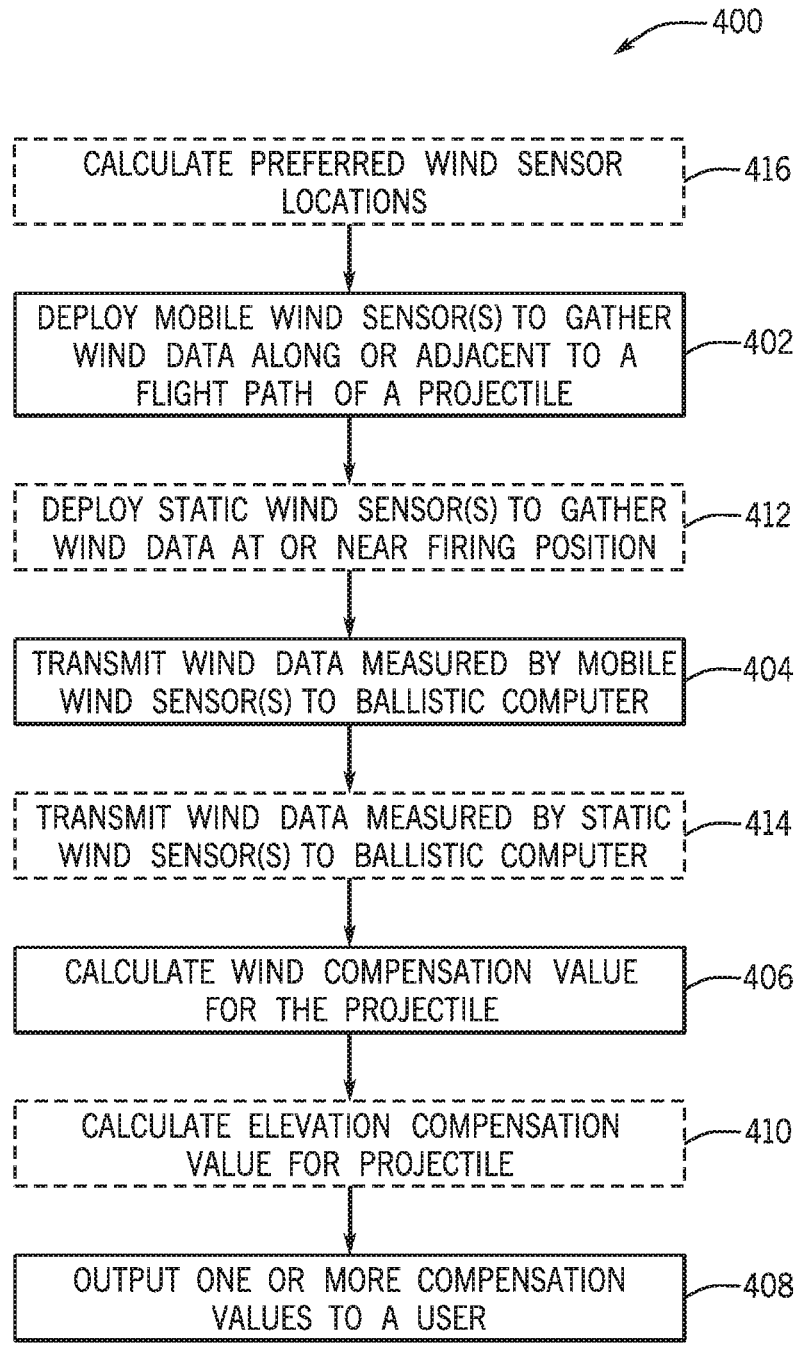
FIG. 13 is a flowchart of a method of calculating a ballistic or firing solution of a projectile according to some examples of the present disclosure.

FIG. 13 is a flowchart of a method 400 of calculating a ballistic or firing solution of a projectile (e.g., the projectile 106) according to some examples of the present disclosure. It should be appreciated that any step, sub-step, sub-process, or block of method 400 may be performed in an order or arrangement different from the embodiments illustrated by FIG. 10. For example, one or more blocks may be omitted from or added to the method 400. Although method 400 is described with reference to the embodiments of FIGS. 1-12B, method 400 may be applied to other embodiments.

As shown in FIG. 13, the method 400 includes deploying one or more mobile wind sensors (e.g., mobile devices 120, sensor systems 312) to gather wind data along or adjacent to a flight path of a projectile (Block 402), transmitting the wind data measured by the mobile wind sensors to a ballistic computer (Block 404), calculating, using the ballistic computer, a wind compensation value for the projectile using the wind data (Block 406), and outputting the wind compensation value to a user (Block 408). In some examples, the mobile wind sensors are operable to gather wind data (e.g., measure both wind speed and wind direction) in respective segments of the flight path. As noted above, deploying the mobile wind sensors may include sending a plurality of drones to respective positions along or adjacent to the flight path. Outputting the wind compensation value may include displaying the wind compensation value on a display. In some examples, the wind compensation value may be displayed within the user's line of vision. Depending on the application, transmitting the measured wind data may include relaying the wind data from one mobile wind sensor to another and to the ballistic computer.

In some examples, the method 400 may include calculating, using the ballistic computer, an elevation compensation value for the projectile (Block 410). The method 400 may include deploying a static wind sensor (e.g., static device 150, static wind sensor 350) to gather wind data at or near a launch or firing position (Block 412). The static wind sensor may be operable to gather wind data (e.g., measure both wind speed and wind direction) at or near the launch or firing position. The method 400 may include transmitting the wind data measured by the static wind sensor to the ballistic computer (Block 414). The ballistic computer may use the wind data measured by the static wind sensor in calculating the wind compensation value for the projectile. The method 400 may include calculating preferred locations to place the mobile wind sensors (Block 416). The preferred locations may be based on at least one of local topography, shooting position, and target location.

Figure 14:
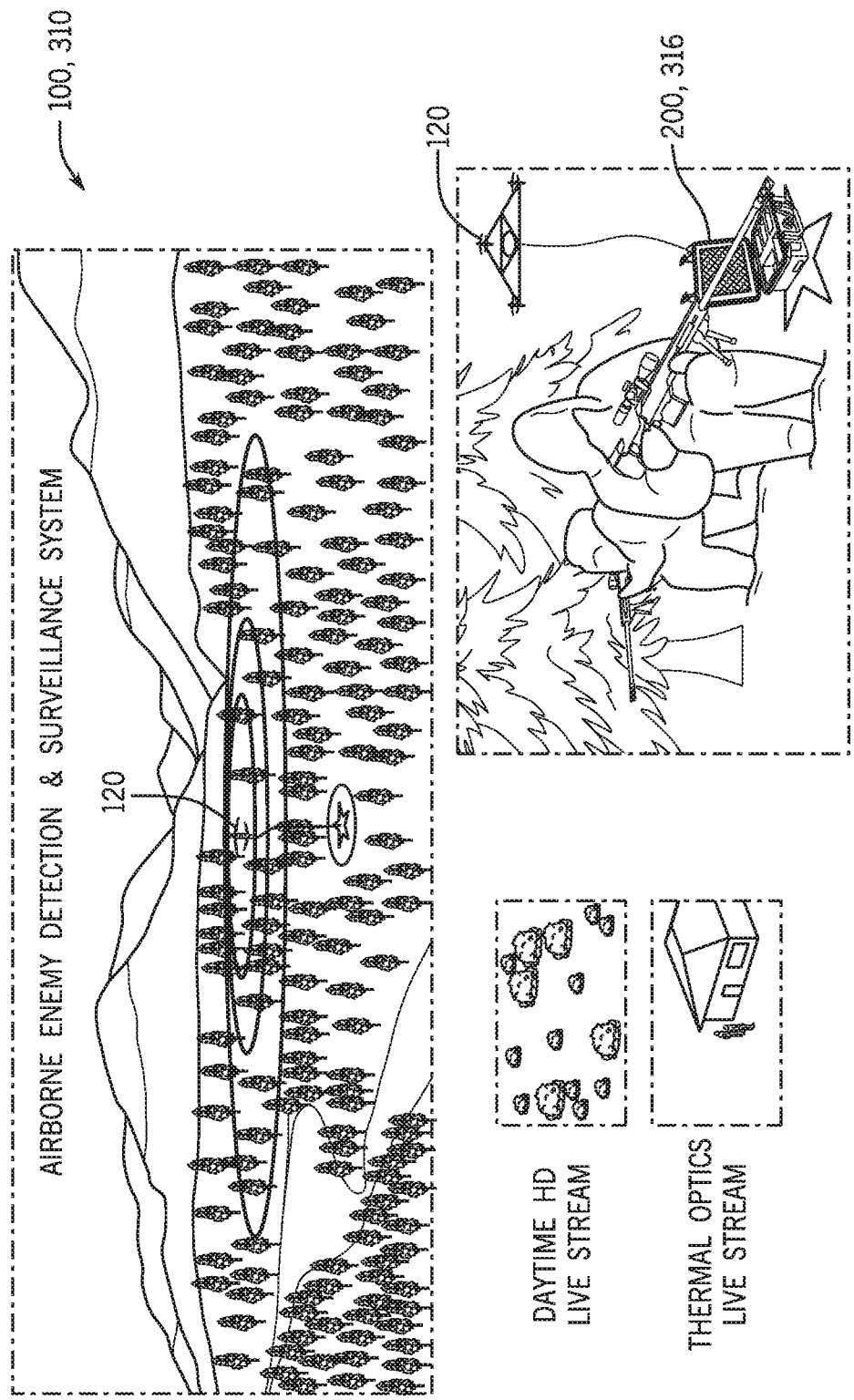
FIG. 14 is a representative view of a ballistic system used as an enemy detection and surveillance system according to some examples of the present disclosure.
Figure 15:
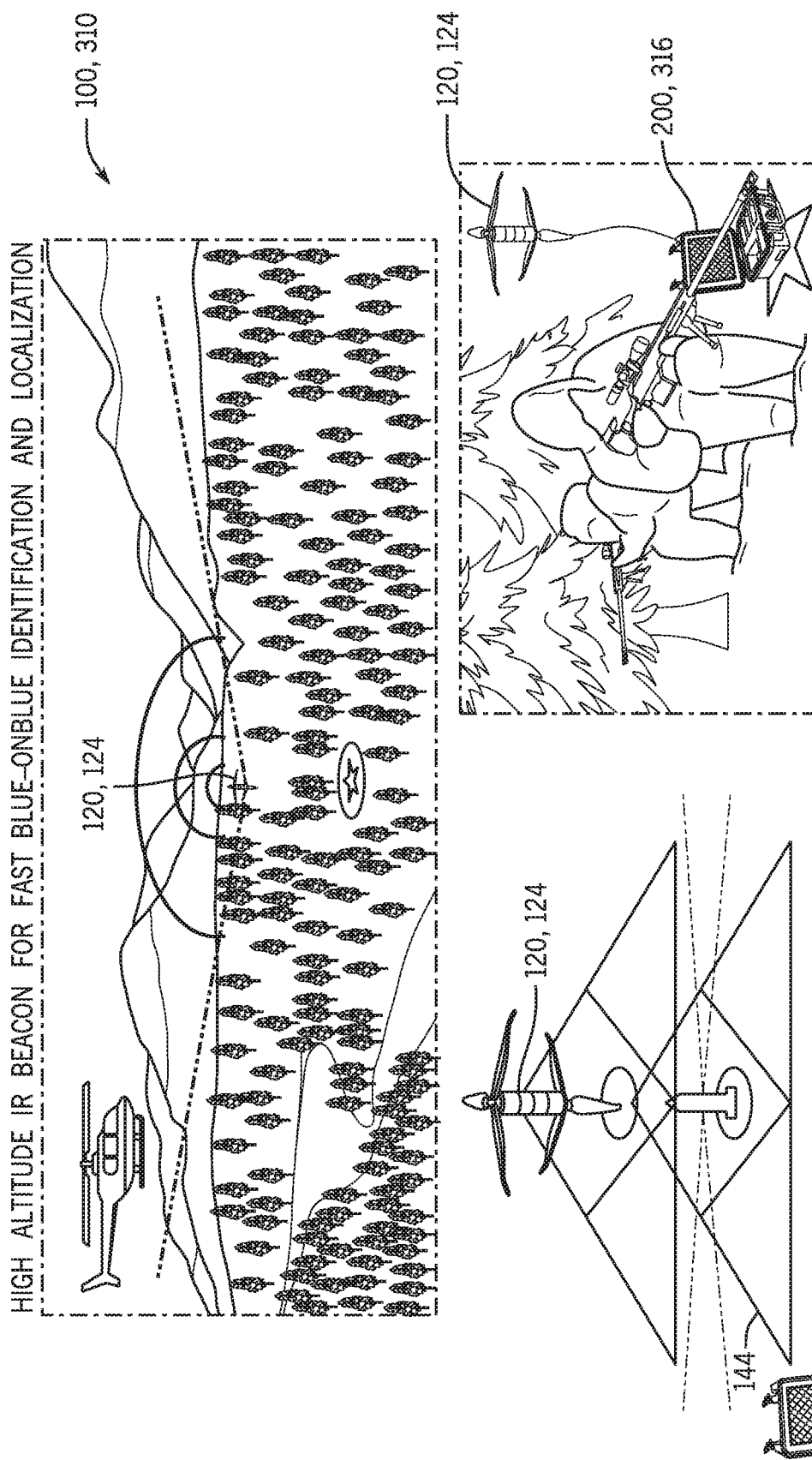
FIG. 15 is a representative view of a ballistic system used as a troop extraction and personnel recovery system according to some examples of the present disclosure.
Figure 16:
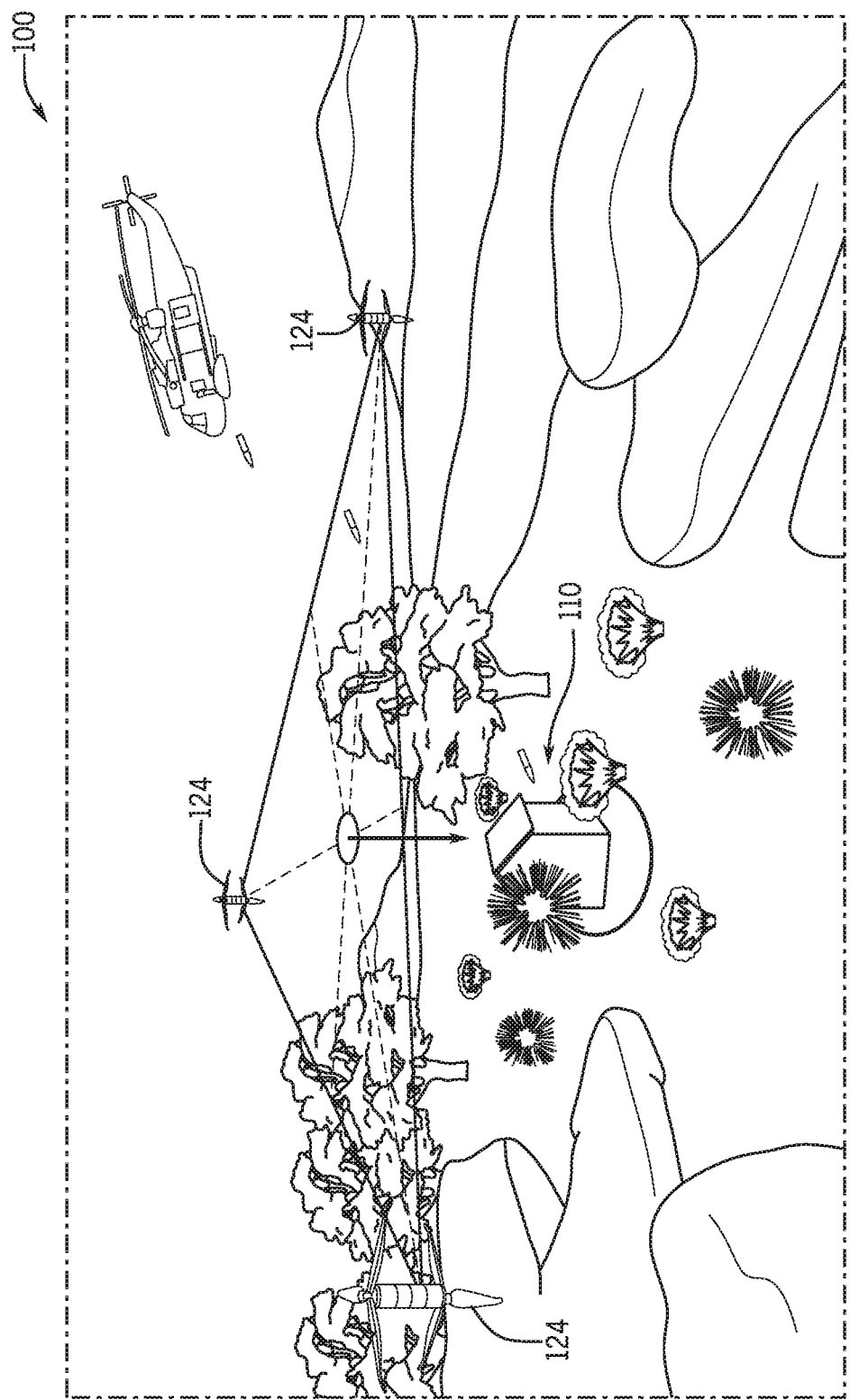
FIG. 16 is a representative view of multiple drones providing indirect targeting for close air support according to some examples of the present disclosure.
Figure 19:
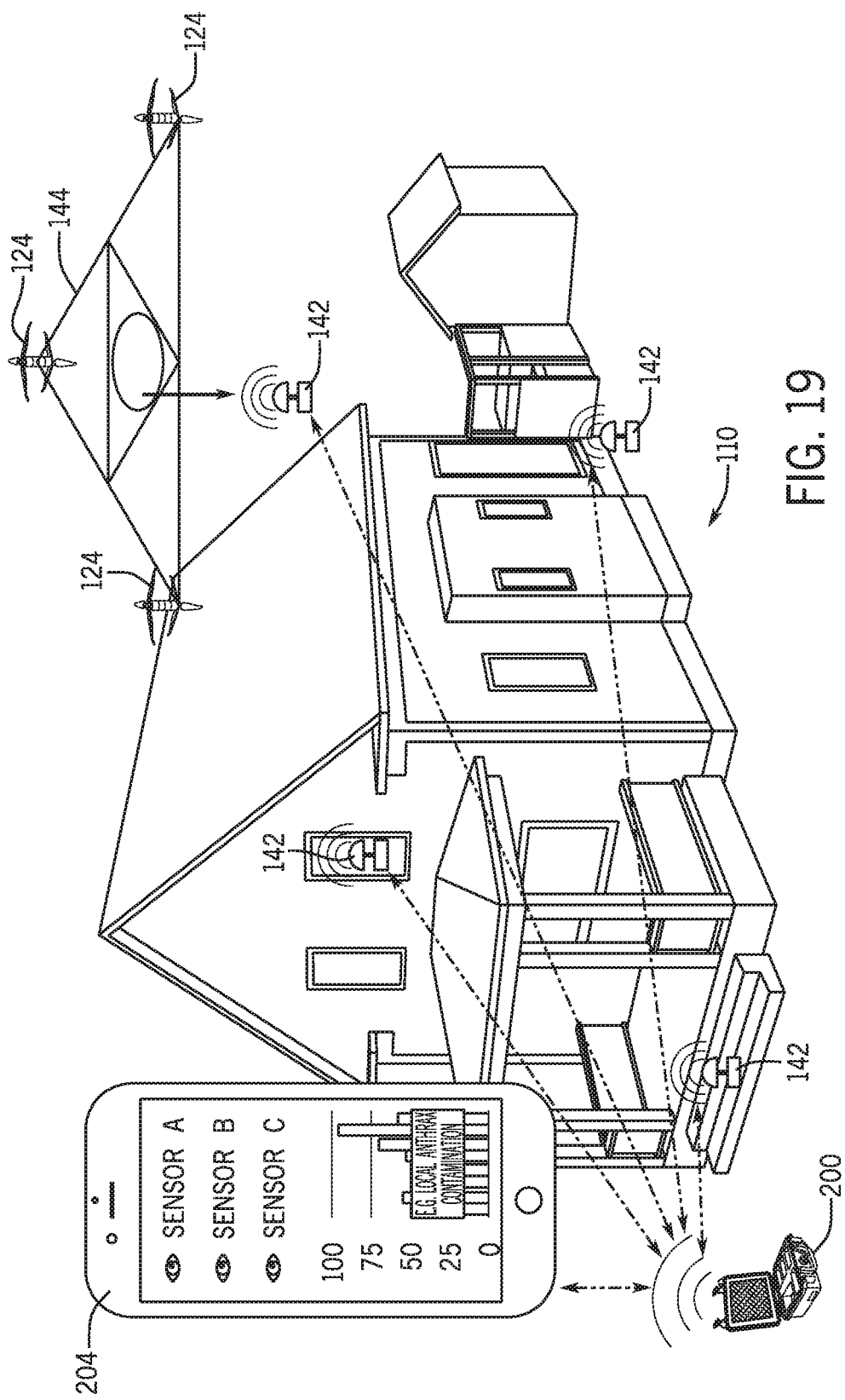
FIG. 19 is a representative view of a sensor system used to deploy one or more sensors according to some examples of the present disclosure.
Figure 20:
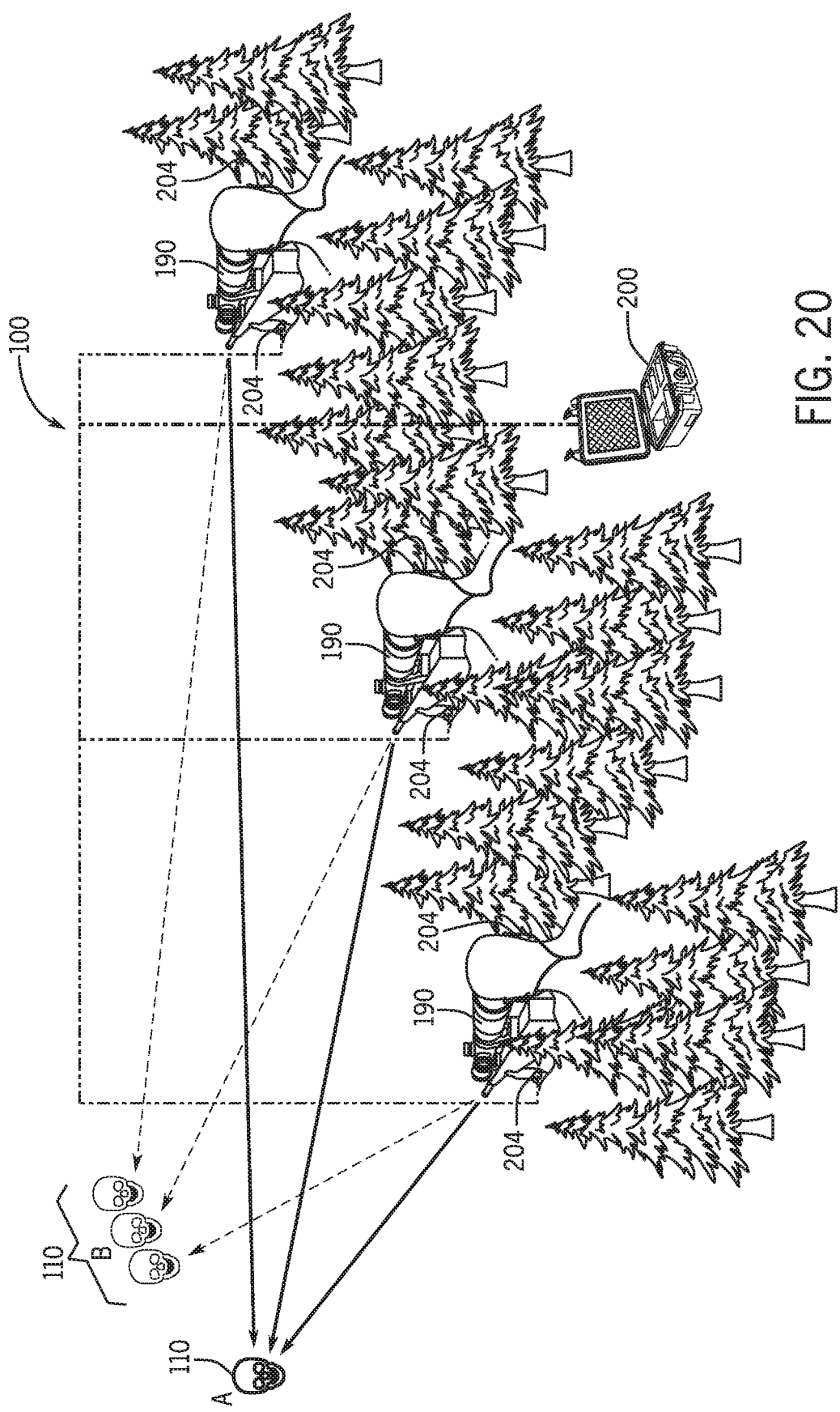
FIG. 20 is a representative view of a ballistic system used amongst multiple shooters according to some examples of the present disclosure.

FIGS. 14-20 illustrate various other applications for the ballistic system 100 and/or ballistic system 310. FIG. 14 is a representative view of a ballistic system used as an enemy detection and surveillance system according to some examples of the present disclosure. FIG. 15 is a representative view of a ballistic system used as a troop extraction and personnel recovery system according to some examples of the present disclosure. FIG. 16 is a representative view of multiple drones providing indirect targeting for close air support according to some examples of the present disclosure FIG. 17 is a representative view of a ballistic system used in a sporting application according to some examples of the present disclosure. FIG. 18 is a representative view of another ballistic system used in a sporting application according to some examples of the present disclosure. FIG. 19 is a representative view of a sensor system used to deploy one or more sensors according to some examples of the present disclosure. FIG. 20 is a representative view of a ballistic system used amongst multiple shooters according to some examples of the present disclosure.

Referring to FIGS. 14-20, the ballistic system 100 and/or ballistic system 310 may provide other benefits in addition to calculating a ballistic solution of a projectile in real time. For instance, as shown in at least FIG. 14, the mobile devices 120 may provide visual feedback to a user/shooter. In such examples, the mobile devices 120 may include or be configured to carry one or more optic systems, such as at least one of a thermal optic system, an IR optics system, and a visual optics system. The mobile devices 120 may provide live stream capabilities of an intended target or the surrounding area. In this manner, the mobile devices 120 may provide airborne enemy detection and surveillance. In some examples, the ballistic system 100 may alert the user/shooter if any movement is detected surrounding the user/shooter or at the intended target. In some examples, the mobile devices 120 may provide feedback to the user regarding shot placement. For instance, the mobile device positioned nearest the target may identify and alert the user/shooter regarding missed shots and confirmed hits. Should the ballistic system 100 identify a missed shot, the ballistic system 100 may account for the location of the miss in calculating the compensation values for follow up shots. In other applications, such as hunting, the drone 124 closest to the target 110 may include a camera. The camera may be configured to focus on the target 110 and provide images via wireless communication or storage on a local drive. The images may show the projectile impact either on the target or misses. The images may be utilized to adjust the aiming point in the event of a missed shot. The sensor systems 312 of ballistic system 310 may include a similar configuration. Still further, while the ballistic system 100 and/or ballistic system 310 has been described as communicating with a dedicated system communication component, it is contemplated that the ballistic system 100 and/or ballistic system 310 may communicate with, or be controlled by, a handheld device such as a mobile phone (e.g., see FIGS. 1, 6, 12A, 16, and 17).

Referring to FIG. 15, the mobile devices 120 may facilitate troop extraction and personnel recovery. For instance, one or more mobile devices 120 may be deployed as a hovering IR beacon (or other visual or signal emitting source) for fast identification and localization of troops/personnel, cargo air drop signaling, or enemy targeting procedures (e.g., link up with unmanned combat aerial vehicle (UCAV), combat helicopter, or combat airplane). Referring to FIGS. 15 and 16, one or multiple drones 124 may be used to define a target location. For instance, as shown in FIG. 15, one or multiple drones 124 may be used to define a target location directly, such as via a single source on spot. As shown in FIG. 16, one or multiple drones 124 may be used to define a target location indirectly. For example, multiple drones 124 may define or otherwise determine a center of a target zone, such as multiple drones triangulating the center of the target zone (e.g., three drones 124 forming a triangle with the center of the triangle defining the target location).

In some examples, the one or more mobile devices 120 may be deployed at a pick-up location to aid recovery personnel in identifying and coordinating troop/personnel extraction/recovery. In some examples, the mobile devices 120 may facilitate ingress and egress into the area of operation. For instance, the mobile devices 120 may provide scouting services identifying potential hazards and routes for ingress and egress. Specifically, the system housing 256 may be configured to be manually carried by a user. The system housing 256 may include a communication component communicating with one or more drones 124. The drones 124 may be configured to follow the system housing 256 by staying within a predetermined radius as the user maneuvers or otherwise traverses a path while carrying the system housing 256. The one or more drones 124 may include sensors, such as sound sensors, infrared and visual cameras, to detect motion, enemy positions, etc. and alert the user to potential dangers, including location and/or direction of the potential danger.

Though described above with reference to military and police snipers, recreational shooters, and hunters, the ballistic systems 100, 310 have broad application. For instance, as shown in FIGS. 17 and 18, the ballistic systems 100, 310 may be used in golf and other sporting applications where wind drift must be accounted for in placing accurate shots, tosses, jumps, or throws. In such examples, the sensor systems 102, 312 may be positioned along or adjacent to the playing field (e.g., along or adjacent to a fairway) to provide wind data at various locations within the playing field. In such examples, the ballistic systems 100, 310 may provide feedback to a user regarding the anticipated effect of wind on the golf ball. In a similar manner, the ballistic systems 100, 310 may provide wind data to provide feedback to a user regarding the anticipated effect of wind on a football, baseball, lacrosse ball, frisbee, arrow, ski jumper, or the like.

Referring to FIG. 19, the ballistic system 100 may be used in cargo deployment and other environmental data acquisition scenarios. For instance, the cargo platform 144 may be configured to carry cargo to and deploy the cargo at a desired location. For instance, the cargo platform 144 may be configured to carry and deploy (drop) a chemical, biological, radiological, or nuclear (CBRN) sensor 142. The CBRN sensors 142 may be deployed in critical areas or territories, such as near or adjacent to the target 110. The CBRN sensors 142 may transmit any gathered data to a centralized system or receiver (e.g., a control system, a mobile phone app, data interface 204, etc.). Though sensors 142 are described as CBRN sensors, sensors 142 may be any type of sensor configured to detect the presence of a toxin, chemical, object, or other threat.

Referring to FIG. 20, the ballistic systems 100, 310 may be utilized by a plurality of users/snipers. In such examples, the ballistic systems 100, 310 may support simultaneous coordinated single or multi-target engagement. For instance, multiple shooters may engage a single target 110 simultaneously (e.g., a single high value target) or multiple shooters may engage multiple targets 110 simultaneously (e.g., multiple targets that must be neutralized in a synchronized fashion to limit detection). In such examples, the data interfaces 204 may be wirelessly shared over a local wireless network amongst the multiple shooters to feed the compensation value(s), as well as any other data or instructions, to the multiple shooters in real-time and simultaneously.

Figure 21:
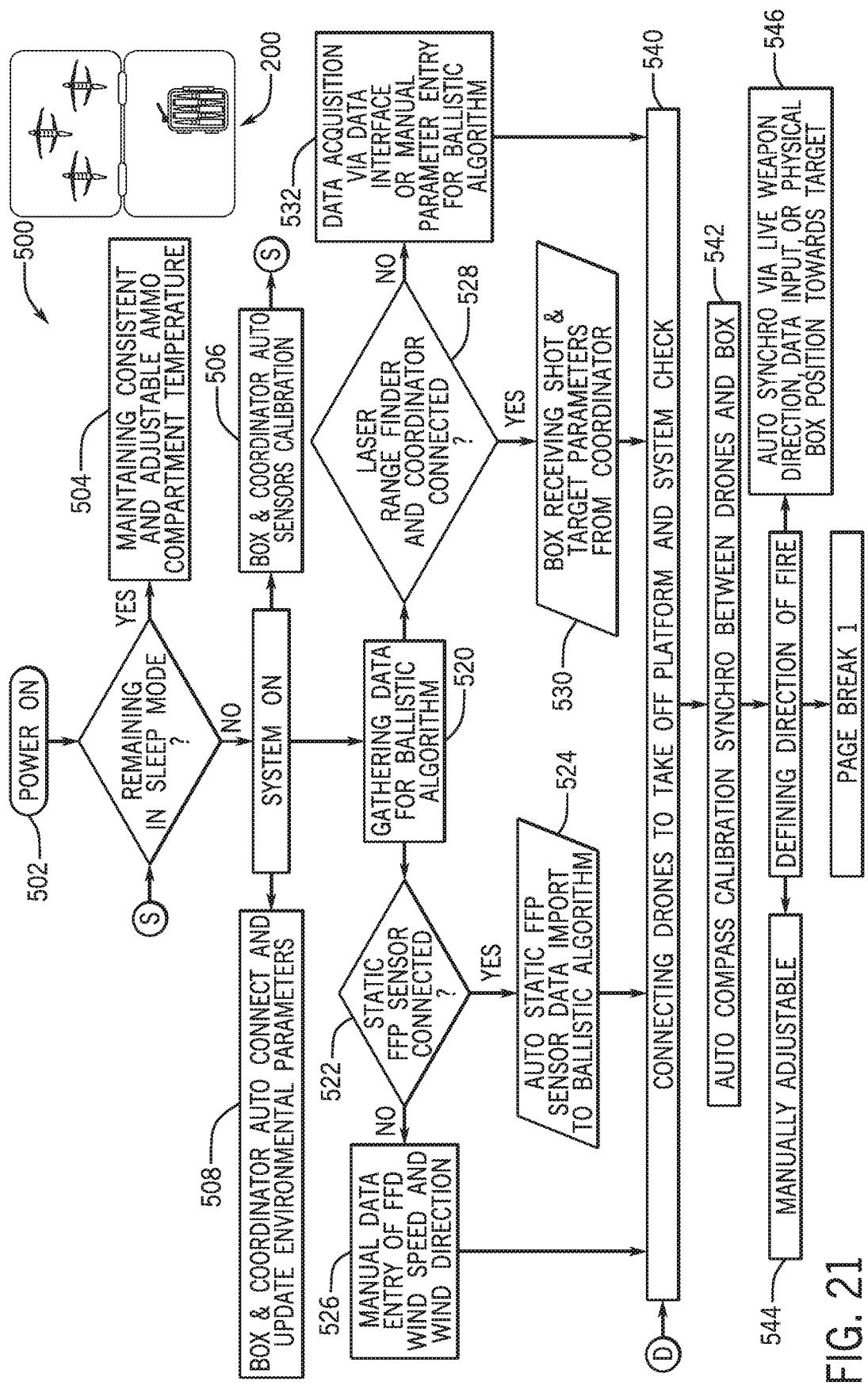
FIG. 21 is a flowchart showing a first portion of a method of utilizing a mission control system according to some examples of the present disclosure.
Figure 22:
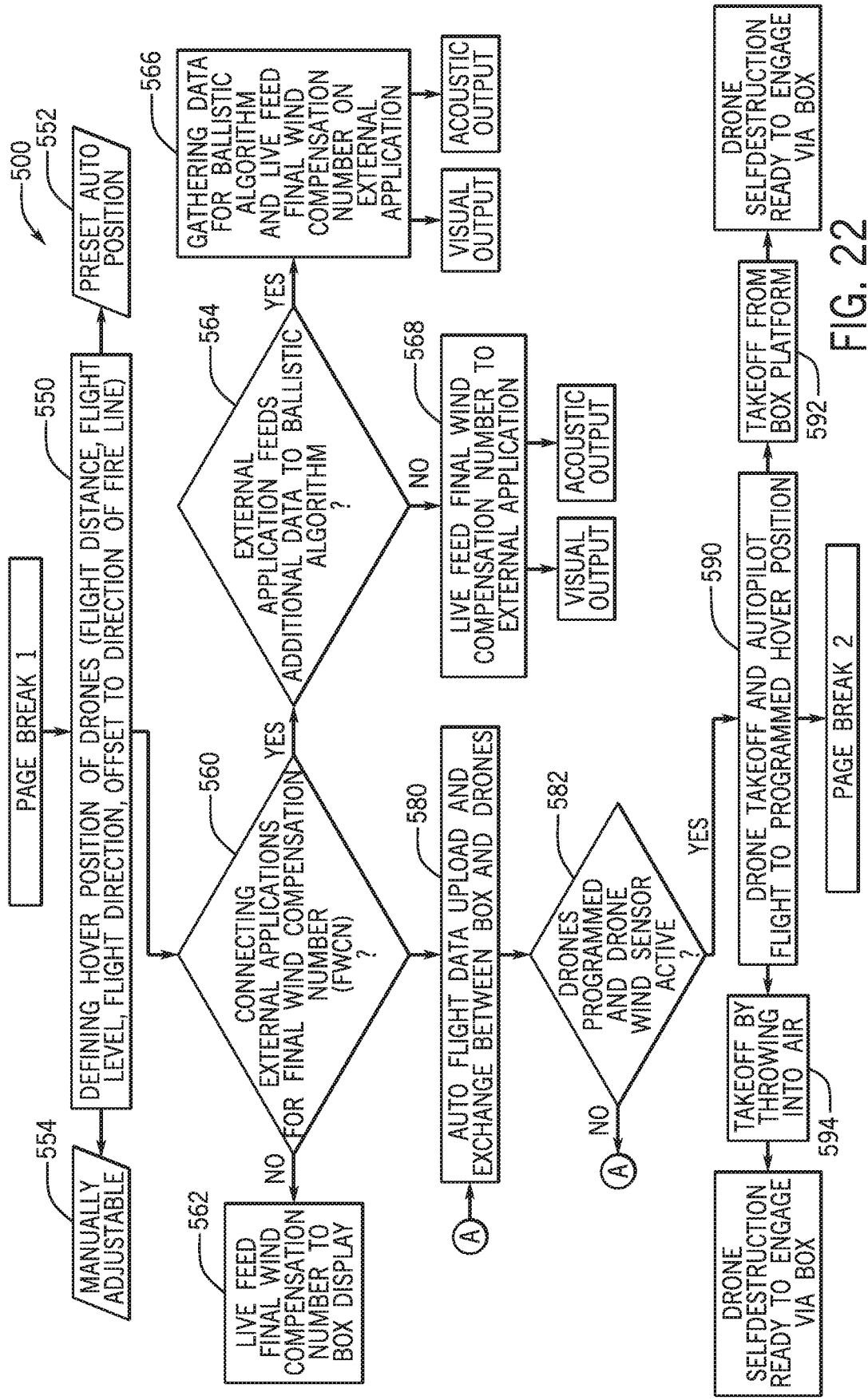
FIG. 22 is a flowchart showing a second portion of a method of utilizing the mission control system according to some examples of the present disclosure.
Figure 23:
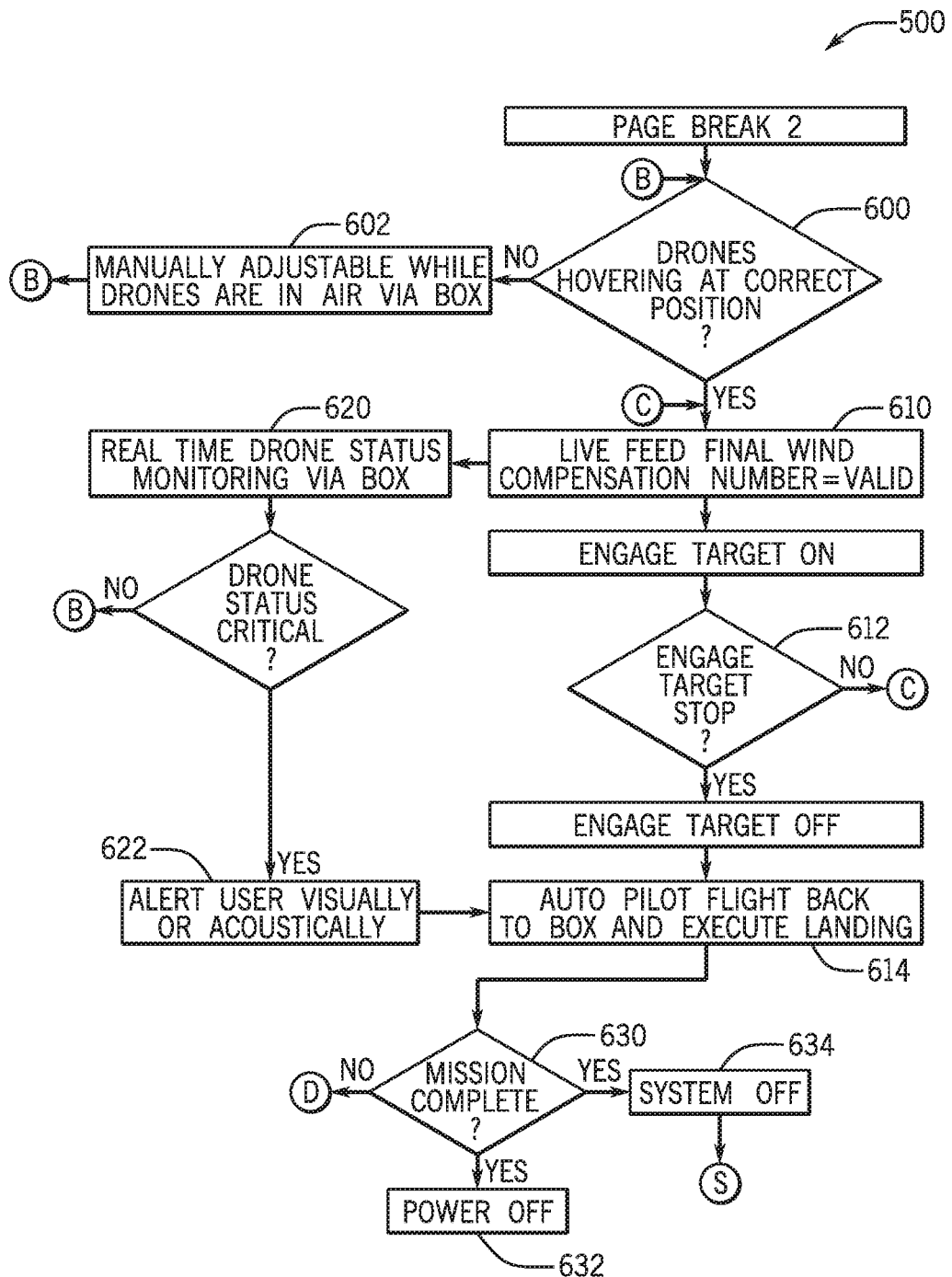
FIG. 23 is a flowchart showing a third portion of a method of utilizing the mission control system according to some examples of the present disclosure.

FIG. 21 is a flowchart showing a first portion of a method 500 of utilizing a mission control system, such as in a sniping application, according to some examples of the present disclosure. FIG. 22 is a flowchart showing a second portion of the method 500 according to some examples of the present disclosure. FIG. 23 is a flowchart showing a third portion of method 500 according to some examples of the present disclosure. Referring to FIGS. 21-23, the method 500 begins by powering on a mission control system (Block 502), such as the mission control system 200 or mission control system 316 described above. If the mission control system is to remain in a sleep mode, the mission control system may maintain a consistent (and adjustable) temperature within an ammunition compartment (Block 504), such as ammunition compartment 248 or 358 described above. Upon waking from the sleep mode, the mission control system may auto-calibrate to its surroundings. For instance, the mission control system may undergo auto-sensor calibration (Block 506) and/or auto-environment updates, such as GPS link up, weather data, etc. (Block 508). For example, Block 506 may include auto-calibration of one or more sensors of the BOX or coordinator based on current conditions, location, etc. In Block 508, the BOX and coordinator may be auto-connected to the system and environmental parameters may be updated.

Once auto-calibration is complete, the mission control system may begin gathering data for ballistic calculations (Block 520). For instance, the mission control system may verify if a static wind sensor (e.g., static device 150 or static wind sensor 350) is connected thereto (Block 522), and if connected, may begin importing the static sensor's data into a ballistic computer (Block 524). If a static wind sensor is not utilized, the user may manually enter wind speed and wind direction conditions existing at the firing position into the ballistic computer (Block 526). Further, the mission control system may verify if a laser range finder and the coordinator is connected thereto (Block 528), and if connected, may receive shot and target parameters from the coordinator (Block 530). For example, in Block 530, the BOX may begin importing the target's distance and the slant angle to the target into the ballistic computer. In Block 532, data acquisition may occur via the coordinator or other data interface, or one or more variables for the ballistic algorithm may be entered manually. In some examples, the mission control system may begin gathering data when requested or prompted by the shooter. For instance, ballistic calculation data may be gathered when requested or prompted by the shooter through the data interface 204 (e.g., via pressing the target button 302 on the data interface 204, as explained above).

As shown in FIG. 21, the method 500 may include programming one or more drones, such as drones 124. Programming may begin by connecting the drones to a take-off/landing platform of a system housing and performing any systems check and battery charging, if needed (Block 540). Thereafter, auto-compass calibration/synchronization may occur between the drones and the mission control system (Block 542). As part of the synchronization process, the method 500 may include defining the direction of fire, whether defined manually by the user (Block 544) or automatically via live weapon direction, data input, or physical position and/or direction of the mission control system towards the target (Block 546). In some examples, the hover positions of the drones may be defined or set (Block 550), whether by auto preset (Block 552) or adjusted manually by the user (Block 554). In setting the hover positions, the mission control system may determine and consider flight distance, flight level, flight direction, and direction of fire, among others, as explained above.

Referring to FIG. 22, the method 500 may include determining whether one or more external applications or devices will be connected to the mission control system (Block 560). If no external applications or devices will be connected to the system, the mission control system may live feed any calculated compensation values, such as a wind compensation value and/or an elevation compensation value, to a digital display (e.g., data interface 204) of the system housing (Block 562). If one or more external applications or devices will be connected to the system, the mission control system may determine whether the external application(s) or device(s) will feed additional data or information to the ballistic computer (Block 564). If so, the mission control system may gather the additional data or information from the external application(s) or device(s) and live feed any calculated compensation values, such as the wind compensation value and/or the elevation compensation value, to the external application(s) or device(s) (e.g., data interface 204), whether visually or acoustically (Block 566). If the external application(s) or device(s) are display systems only, the mission control system may live feed any calculated compensation values, such as the wind compensation value and/or the elevation compensation value, to the external application(s) or device(s) (e.g., data interface 204), whether visually or acoustically (Block 568).

With continued reference to FIG. 22, the method 500 may include one or more pre-flight systems checks, such as verifying data upload/exchange between the mission control system and the drones (Block 580) and/or verifying the drones are active and the wind sensors are active (Block 582). If everything checks out, the drones may begin flight operations (Block 590), such as taking off from a platform (Block 592) or beginning flight after being thrown into the air by a user (Block 594). At any point during flight, the user may activate a destruction application to remotely destroy the drones. During flight, the mission control system may verify whether the drones are hovering or flying at their correct positions and make any necessary adjustments (Block 600). In some examples, the hovering or flying positions of the drones may be adjusted manually by the user while the drones are in flight and via the mission control system (Block 602).

Referring to FIG. 23, the final wind compensation value and/or elevation compensation value may be live fed to one or more data interfaces (Block 610), such as any of data interfaces 204 described above. The one or more compensation values may be live fed to the data interface(s) until the user disengages the target and indicates to the mission control system to stop engagement (Block 612). If the mission control system detects user disengagement of the target, the drones may be auto-piloted back to the mission control system and execute landing via direct or indirect (deceptive) flight paths (Block 614). After successful target engagement, the drones may fly auto-piloted to a designated GPS coordinate and execute automated landing procedures (e.g., on a defined troop exfiltration rendezvous point to be picked up by hand by the sniper or user leaving the area of operation). During engagement of the target, the mission control system may monitor the status of the drones in real time (Block 620). If the status of the drones, as detected by the mission control system, becomes critical (e.g., low battery, malfunction detected, enemy electronic warfare signal detection, drone jamming, etc.), the method 500 may include alerting the user, whether visually or acoustically, of the critical status (Block 622). If the drone status becomes critical, the method 500 may immediately proceed to Block 614 in which the drones are auto-piloted back to the mission control system and landed. Once the drones execute a landing, the mission control system may verify whether the desired mission is complete (Block 630). If complete, the mission control system may power off (Block 632) or enter a sleep mode (Block 634).

All relative and directional references are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A ballistic system comprising:
a plurality of airborne devices each operable to gather wind data along or adjacent to a flight path of a projectile to a target, each airborne device measuring at least wind speed and wind direction;
a ballistic computer in data communication with the plurality of airborne devices to receive the wind data, the ballistic computer configured to calculate a wind compensation value for the projectile based on the wind data;
a data interface in data communication with the ballistic computer to output the wind compensation value to a user; and
a flight module configured to calibrate a flight path of the plurality of airborne devices.

2. The ballistic system of claim 1, further comprising a scope, wherein:
the scope is in data communication with the ballistic computer; and
a windage adjustment is made automatically by the scope after receiving the wind compensation value from the ballistic computer.

3. The ballistic system of claim 1, wherein the data interface comprises at least one of a digital display of the ballistic computer and a digital display mounted on a firearm.

4. The ballistic system of claim 3, wherein the digital display mounted on the firearm comprises at least one of a slant angle meter and a tiltmeter.

5. The ballistic system of claim 4, wherein at least one of the slant angle meter and the tiltmeter is in data communication with the ballistic computer.

6. The ballistic system of claim 1, wherein the plurality of airborne devices measure wind speed and wind direction in respective ballistic segments along a flight path of the projectile.

7. The ballistic system of claim 1, further comprising at least one static device operable to gather wind data at or near a launch or firing position.

8. The ballistic system of claim 1, wherein each airborne device comprises at least one of a drone and a remote wind sensor at designated spots along or adjacent to the flight path of the projectile.

9. The ballistic system of claim 1, wherein the ballistic computer is in wireless communication with at least one of the plurality of airborne devices.

10. The ballistic system of claim 1, wherein the airborne devices are in data communication with one another.

11. The ballistic system of claim 1, wherein the projectile is at least one of a bullet, an artillery shell, a mortar shell, a ballistic missile, a golf ball, and a football.

12. A ballistic system comprising:
a mission control system including a ballistic computer and a data interface; and
a plurality of sensor systems operable to measure environmental data along a flight path of a projectile, the plurality of sensor systems in data communication with the mission control system and comprising one or more drones, each sensor system measuring position and wind data at its respective location;
wherein the ballistic computer calculates a wind compensation value for the projectile to hit a desired target;
wherein the data interface displays the wind compensation value; and
wherein the mission control system further comprises a flight module configured to calibrate a flight path of the one or more drones.

13. The ballistic system of claim 12, wherein the wind data is measured by the one or more drones using at least one of external wind sensors, a gyroscope, GPS positioning, and visual drift sensors.

14. The ballistic system of claim 12, wherein the one or more drones comprises three drones that emit signals to define a target location.

15. The ballistic system of any of claim 12, wherein the mission control system further comprises:
a storage compartment to receive the plurality of sensor systems during transport;
a temperature-controlled ammunition compartment;
a power module operable to charge the plurality of sensor systems;
a communications module operable to transmit instructions to and receive data from the plurality of sensor systems; and
an interlink module in data communication with one or more external devices or applications.

16. The ballistic system of claim 15, wherein the power module includes one or more rechargeable batteries connected to a solar panel.

17. The ballistic system of claim 12, wherein the mission control system is contained within a portable container.

18. The ballistic system of claim 12, wherein each sensor system includes a destruction application allowing the sensor system to be destroyed remotely by the mission control system.

19. The ballistic system of claim 12, wherein the mission control system supports a plurality of users engaging a single target or multiple targets.

20. The ballistic system of claim 19, wherein the data interface is shared wirelessly over a local wireless network amongst the plurality of users to feed the wind compensation value to the plurality of shooters in real-time and simultaneously.

21. A method of calculating a ballistic solution of a projectile, the method comprising:
transmitting, to a ballistic computer, wind data gathered by a plurality of airborne devices and along or adjacent to a flight path of the projectile to a target, the wind data comprising wind speed and wind direction in multiple segments of the flight path;
calculating, using the ballistic computer, a wind compensation value for the projectile using the wind data;
outputting the wind compensation value to a user; and
calibrating a flight path of the plurality of airborne devices.

22. The method of claim 21, further comprising calculating, using the ballistic computer, an elevation compensation value for the projectile.

23. The method of claim 21, further comprising:
transmitting, to the ballistic computer, wind data gathered by a static device near a launch or firing position, the wind data comprising wind speed and wind direction at or near the launch or firing position;
wherein the ballistic computer uses the wind data gathered by the static device in calculating the wind compensation value for the projectile.

24. The method of claim 21, wherein the plurality of airborne devices comprises a plurality of drones positioned along or adjacent to the flight path.

25. The method of claim 24, wherein at least one drone of the plurality of drones includes or functions as a cargo platform to lift and place a remote wind sensor at a position along or adjacent to the flight path.

26. The method of claim 21, further comprising calculating preferred locations to place the airborne devices based on at least one of local topography, shooting position, and target location, the preferred locations calculated automatically by the ballistic computer.

27. The method of claim 21, wherein outputting the wind compensation value to the user comprises displaying the wind compensation value on a display within the user's line of vision.

28. The method of claim 21, wherein transmitting the wind data to the ballistic computer includes relaying the wind data from one airborne device to another and to the ballistic computer.

* * * * *